(12) United States Patent
King et al.

(10) Patent No.: US 11,609,921 B2
(45) Date of Patent: *Mar. 21, 2023

(54) SYSTEMS AND METHODS FOR DYNAMIC COMPUTER AIDED INNOVATION VIA MULTIDIMENSIONAL COMPLEMENTARY DIFFERENCE RECOMMENDATION AND EXPLORATION

(71) Applicant: Exaptive, Inc., Oklahoma City, OK (US)

(72) Inventors: David King, Oklahoma City, OK (US); Stephen Arra, Oklahoma City, OK (US); Frank Evans, Oklahoma City, OK (US); Alanna Riederer, Oklahoma City, OK (US)

(73) Assignee: Exaptive, Inc., Oklahoma City, OK (US)

( * ) Notice: Subject to any disclaimer, the term of this patent is extended or adjusted under 35 U.S.C. 154(b) by 324 days.

This patent is subject to a terminal disclaimer.

(21) Appl. No.: 16/749,700

(22) Filed: Jan. 22, 2020

(65) Prior Publication Data

US 2020/0233863 A1 Jul. 23, 2020

Related U.S. Application Data

(60) Provisional application No. 62/795,354, filed on Jan. 22, 2019.

(51) Int. Cl.
*G06F 16/2458* (2019.01)
*G06F 16/22* (2019.01)
*G06F 16/2457* (2019.01)

(52) U.S. Cl.
CPC ...... *G06F 16/2458* (2019.01); *G06F 16/2264* (2019.01); *G06F 16/2457* (2019.01)

(58) Field of Classification Search
CPC ............ G06F 16/2458; G06F 16/2264; G06F 16/2457; G06F 16/9536
See application file for complete search history.

(56) References Cited

U.S. PATENT DOCUMENTS

| 8,407,263 B2 * | 3/2013 | Elad ........................ G06Q 10/10 707/728 |
| 10,248,712 B1 * | 4/2019 | Cheng .................... G06F 16/285 |

(Continued)

OTHER PUBLICATIONS

Office Action regarding U.S. Appl. No. 16/945,261 dated Sep. 4, 2020.

*Primary Examiner* — Hosain T Alam
*Assistant Examiner* — Chongsuh Park
(74) *Attorney, Agent, or Firm* — Dunlap Codding, P.C.

(57) ABSTRACT

Systems and methods for dynamic computer aided innovation via multidimensional complementary difference recommendation and exploration are disclosed including categorizing a first and second data element in a database with a first attribute and second attribute, respectively, of a first dimension, a dimension being an aspect of a situation, problem, or thing. The first and second data elements are categorized with a first attribute and a second attribute of a second dimension, the second dimension being different from the first dimension. Analyzing the first and second attribute of the first dimension and the first and second attribute of the second dimension to determine a ratio of similarity and dissimilarity; calculating a composite score of the ratio of the first dimension and the ratio of the second dimension; and generating and storing a link between the first and second data element when the composite score is within numerical limits.

14 Claims, 32 Drawing Sheets

(56) References Cited

U.S. PATENT DOCUMENTS

| | | | |
|---|---|---|---|
| 10,268,735 B1* | 4/2019 | White | G06F 16/24578 |
| 2014/0156588 A1* | 6/2014 | Mohanty | G06F 16/21 |
| | | | 707/600 |
| 2016/0253406 A1* | 9/2016 | Schmitz | G06Q 50/06 |
| | | | 707/740 |
| 2018/0336710 A1* | 11/2018 | Zhao | G06K 9/6232 |
| 2020/0233863 A1 | 7/2020 | King | |

* cited by examiner

Too little in Common a Low Innovation Potential
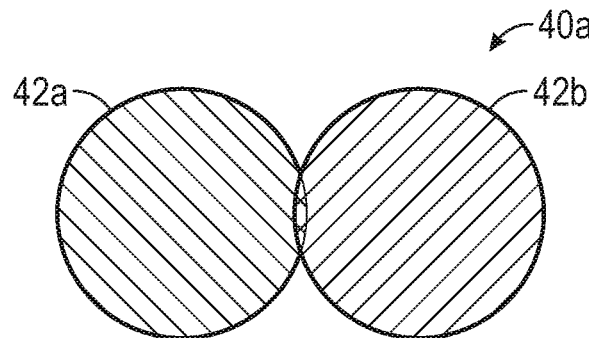
Too Much in Common a Low Innovation Potential
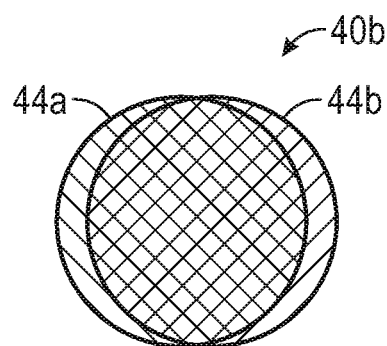
Commonsity with Complementary Difference a High Innovation Potential
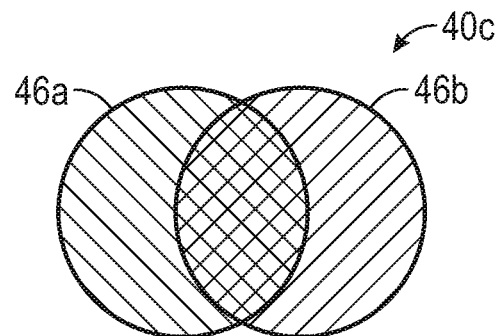
FIG. 2

FIG. 3

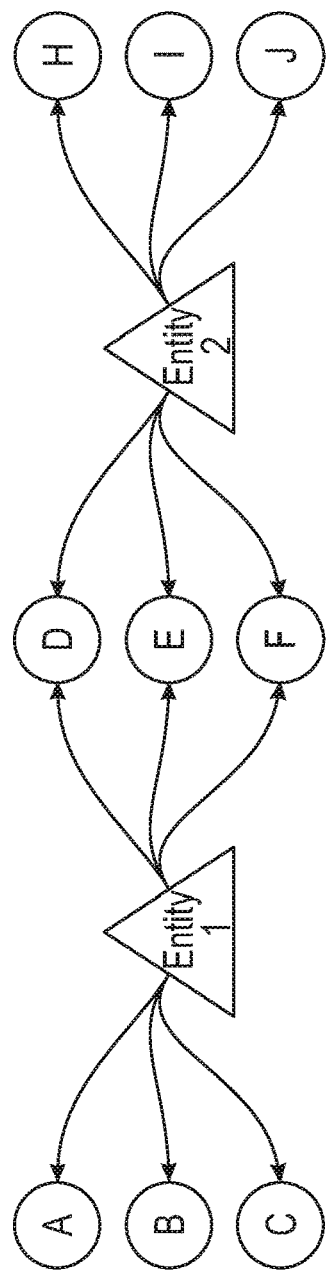
FIG. 8A
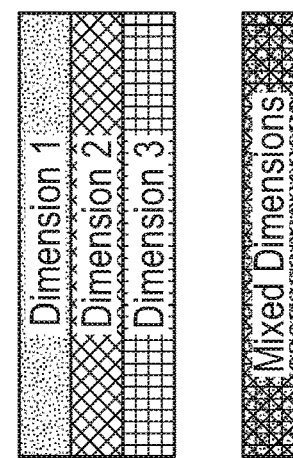
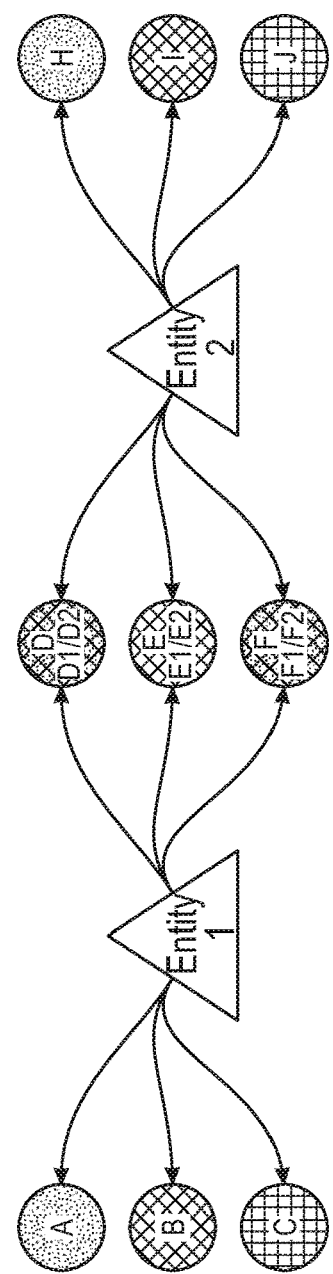
FIG. 8B

FIG. 13

Suggestions

Concept to Recommend: [Team Member ▼]

XXXXX

1 {
2 "x{xxxxxxxxxxxxxxxxxxx}"x{},
3 "x{xxxxxxxxxxxxxxxxxxx}"x{},
4 "x{xxxxxxxxxxxxxxxxxxx}"x{},
5 "x{xxxxxxxxxxxxxxxxxxx}"x{}
6 }

Scoring

1 {
2 "x{xxxxxxxxxxxxxxxxxxxxxx}"x
3 "xxxxxxx":{
4 "xxxx"
5 },
6 "xxxxxxxx" "xxxxx",
7 "xxxxx":{},
8 "xxxxx",
9 "xxxxxxxxx", "x(x)xxxx"
10 }
11 }
12 }
13 }
14 "x{xxxxxxxxxxxxxxxx}" x} xxxxxxx

Dimension Score = f(Common Count, Difference Count)
Combined Score = f(Dimension Score, Dimension Count)
Team Score = f(Descriptive statistics on all pairwise scores)

xxxx xxxxx

Sidebar: UNIVERSITY OF OKLAHOMA — xxx, xxxxx, People, Tools, Elements, xxx, xxxxx, Schema, Suggestions, xxxxx, Settings Top menu: Data Community Tools [Admin]

160

Public Profile

Display Name

John Doe

Bio

[Save]

Datasets  socio-economic  GIS
Focus  water quality
Methodologies  watershed studies
Tool's  Matlab  ArcGIS

[Change]

IProfile
Account

FIG. 21

Post an activity ~404

User
Select a user to post activity...

Summary
Write a summary or title for the post...

Post content...
Post contents...

Submit Activity

~480

Read an activity feed ~482

User
Select a user's activity feed...

↻ Refresh Feed

Feed

ⓟ 2018-07-17 19:34:51.540000
Test Hyperlink :Not sure how to do this click here

ⓟ 2018-07-17 19:27:34.310000
Your content node is really tough to align! :Hey Joe, every time the consolidation service pulls your content node's data, we have to get rid of your crappy field name with spaces. Could you just use a better naming convention.

ⓟ 2018-07-17 19:07:16.138000
New data now available :You should check it out.

ⓟ 2018-07-10 19:40:41.082000
This is another notification about your interest map :There were two new resources uploaded ⓟ 2018-07-10 18:36:36.424000
New Notification :This is a new notification ⓟ 2018-07-03 05:59:20.953000
KiaaP new resources! :A new resource is available

FIG. 25C

SYSTEMS AND METHODS FOR DYNAMIC COMPUTER AIDED INNOVATION VIA MULTIDIMENSIONAL COMPLEMENTARY DIFFERENCE RECOMMENDATION AND EXPLORATION

INCORPORATION BY REFERENCE

The present patent application claims priority to and hereby incorporates by reference the entire content of United States Provisional patent application identified by U.S. Ser. No. 62/795,354 filed on Jan. 22, 2019.

BACKGROUND

Innovation is broadly divided in the literature into two categories: incremental innovation and radical innovation. Because radical innovation has proven more difficult to facilitate than incremental innovation much of the research regarding radical innovation has involved analysis of the mechanisms by which it occurs. Despite a growing body of literature finding common themes in the conditions generative of radical innovation, such as the repurposing of existing knowledge within new contexts, there is a lack of technological systems that operationalize the knowledge of these mechanisms in order to actively facilitate the production of new radical innovations.

A working paper from MIT and Stanford suggests that good ideas are getting harder to find. For the last 70 years, the number of researchers has been increasing, but "total factor productivity" by the researchers has remained flat, or if anything, gone down.

Total Factor Productivity (TFP) is an economic measure of innovation. Total Factor Productivity can be defined as the portion of output not explained by the amount of inputs used in production. As such, its level is determined by how efficiently and intensely the inputs are utilized in production. TFP growth is usually measured by the Solow residual.

Data has shown that from the year 1930 to the year 2000, the productivity per researcher has gone down. But, increasing the effective number of researchers is costly. As the number of researchers increase, the costs of conducting the research has also increased. This has led at least one commentator to conclude that the economic cost of obtaining additional productivity gains is increasing.

Within the scientific community, there is a longstanding belief that enhancing collaboration between researchers also enhances productivity. In fact, data has shown that discoveries are taking more and more individuals. This can be shown, for example, by an increasing trend in the number of authors per scientific paper.

In recent years, the Internet has been used to enhance communication and collaboration between researchers. The Internet is a global computer network providing a variety of information and communication facilities, consisting of interconnected networks using standardized communication protocols. Part of the communication facilities on the Internet are websites. A website is a location connected to the Internet that maintains one or more pages on the World Wide Web. The World Wide Web is an information system on the Internet that allows documents to be connected to other documents by hypertext links, enabling the user to search for information by moving from one document to another.

Many algorithms exist that attempt to provide content on the Internet that will be liked by users. One algorithm creates content or updates content extracted from semantic analysis of content and of electronic social interactions among users and between users and content. See for example U.S. Patent Publication No. 2014/0122595. This system includes a meta data engine that gathers data from users, courses, episodes, discussions, notes, chats, video, slides, and text. Then, the system assigns weights to data components based upon frequency of specific keywords in proximity to other keywords. The system may incorporate or link to a relational engine to determine what a user does and does not deem to be important. Further, the system may also use feedback on whether presented content is relevant or not to enable self-tuning.

Algorithms also exist that characterize the similarity between elements of a database or, more generally, nodes of a weighted and undirected graph. See for example, "Random-walk computation of similarities between nodes of a graph with application to collaborative recommendation", IEEE Trans. Knowledge Engineering, January 2007. The model was evaluated on a collaborative-recommendation task where suggestions were made about which movies individuals should watch based upon what they watched in the past.

In general, these algorithms try to create content, update content, compute similarities or make recommendations based upon what a user is expected to like. This can, however, lead to a detrimental phenomenon known as "filter bubble". A filter bubble is an intellectual isolation that can occur when websites make use of algorithms to selectively assume the information a user would want to see, and then give information to the user according to this assumption. Websites make these assumptions based on the information related to the user, such as former click behavior, browsing history, search history and location. For that reason, the websites are more likely to present only information that will abide by the user's past activity. A filter bubble, therefore, can cause users to get significantly less contact with contradicting viewpoints, causing the user to become intellectually isolated.

With respect to promoting collaboration, it has been shown that collaboration between collaborators having high amounts of similarity or dissimilarity is generally ineffective. It would be beneficial to be able to analyze elements of a database (or nodes and edges of a graph) to determine beneficial relationships that do not have detrimental levels of similarity or dissimilarity in order to enhance collaboration, counteract the effect of filter bubbles, and increase content recommendations that have signatures of combinatorial synergy associated with radical innovation. It is to such a system and method that the present disclosure is directed.

SUMMARY

Research has shown that innovation can be facilitated through the introduction of complementary difference. Complementary difference is when a perspective is introduced that is not normally present in a particular context but is compatible with at least one aspect of the problem context. One type of complementary difference that has been frequently linked to both innovative scientific research and innovative product development is when methodologies from one field are applied to subject matter in a field that doesn't employ that methodology. The Astronomical Medicine (AstroMed) Project at Harvard University, as an example, was born from an innovation in which a 3d imaging methodology from the medical field was applied to astronomical investigation which had never employed such a method.

The complementary difference inherent in the AstroMed Project can be thought of as the result of a two-dimensional categorization where dimension one is visualization challenge and dimension two is field of study. While astronomy and medicine were different with regard to field of study, they were complementary with regard to having a similar visualization challenge related to the need to reconstruct 3d models from a series of 2d "slices". This two-dimensional complementary difference represented a latent innovation opportunity but it was not discovered in any such formal data-driven way. It was instead discovered through the serendipitous meeting of two researchers at a conference in 2004. As the world accumulates a larger burden of knowledge and addresses the knowledge through increased specialization, the serendipitous conditions necessary for such innovative collaborations are becoming less likely to occur. There is a need for technological systems that assist researchers to identify such innovation opportunities instead of leaving the discovery of such areas to chance.

Because complementary difference requires that two concepts are simultaneously compatible in one area and foreign in another, an algorithmic system may identify complementary differences across multiple dimensions. For example, Clint Eastwood is both a movie director and an actor. The introduction of the concept of "Clint Eastwood" into a team trying to produce an innovative movie is not alone sufficient to know whether that concept is complementary or contradictory. If the concept of Clint Eastwood includes the dimension of "role", then it becomes possible to recognize that the introduction of Clint Eastwood in a director role to a team that already includes a director would be potentially contradictory, whereas the introduction of Clint Eastwood in an acting role would be potentially complementary.

While the "role" dimension allows for the inference of complementarity or difference, it is insufficient, by itself, for determining whether there is combined complementary difference. That is because incorporating Clint Eastwood as an actor that has primarily acted in Westerns into a movie that is also a Western would be complimentary but not different. By adding a second dimension of "genre" to the data model, it becomes possible to determine complementary difference. Incorporating Clint Eastwood as actor into a movie of a genre in which he has seldom acted, like science-fiction, would be different. This example shows that it is the more nuanced data modeling of multiple concepts about multiple entities across multiple dimensions that allows for algorithmic exploration of complementary difference.

Because complementary difference computations grow combinatorially based on the number of entities and dimensions involved, the solution space quickly grows large as the number of entities and dimensions increase. In this large solution space, it is possible for different combinations of entities and dimensions to have similar ratios of commonality and difference but for very different reasons. It is an important aspect of the disclosure to describe a computation system capable of generating complementary difference scores, as well as a visualization system that allows the user to understand and explore what those scores represent and how such scores compare to other options available within the combinatorial space of possibilities.

Every computer system may be limited by the available data. A user of the computer system will often have additional implicit knowledge about the problem, context, and entities involved that the computer system lacks. To address this, the visualization system may be interactive so as to support human-computer collaboration in which the computation and visualization capabilities of the computer system augment the creative and intuitive capabilities of the user. This allows the computer system to support three modes of use. In the first mode, the computation capability of the computer system is generating complementary recommendations without the help of the user. In the second mode, the visualization capabilities may assist the user in identifying complementary recommendations. In the third mode the computation capabilities and the visualization capabilities of the computer system work together in an iterative manner to generate complementary recommendations.

Through the combination of multi-dimensional calculation and exploratory interactive visualization, the disclosure addresses challenges related to decreasing innovation output per researcher, and the intellectual isolation that can occur by individuals with too little contact with viewpoints different from their own. The methods and systems described herein include modeling entities and context as a plurality of distinct data elements across a plurality of dimensions, analyzing attributes of pairs of distinct data elements on a dimension by dimension basis for similarities and dissimilarities, combining the dimensional scores to form a composite score for the plurality of data elements for the subset of dimensions analyzed, and providing a set of interactive visual tools by which the user can explore these analyses and add data that in turn generates new possible recommendations. In some embodiments, the system can be used to discover collaboration teams with complementary difference scores within desired numerical ranges for particular characteristics of interest. In other embodiments the system can be used to discover groups of non-person elements that may be innovative when combined together, for example, groups of code components, instruments, machines, or ideas. Because the system is agnostic to whether an element is a person or not, it can be used in a third embodiment to build assemblies of both person and non-person elements—teams of people positioned to innovate along with the assets they can use to do so.

BRIEF DESCRIPTION OF SEVERAL VIEWS OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings:

FIG. 2 are Venn diagrams that illustrate the concept of complementary difference for a single pair of data elements for a single dimension in which low innovation potential exists due to too little in common, low innovation potential exists due to too much in common, and high innovation potential exists due to a more balanced ratio of commonality with difference.

FIG. 3 is a spreadsheet of data from a database having a listing of individuals and three dimensions with multiple attributes describing the individuals being assigned to particular dimensions.

FIG. 8A is another network diagram of two data elements with each data element having no dimensionality assigned to the attributes, and with each data element having three unique attributes and three shared attributes, the value for each attribute identified with a letter.

FIG. 8B is another network diagram of the two data elements of FIG. 8A in which three dimensions have been introduced, each attribute value has been shaded based on which dimension the particular attribute belongs to, and two of the attributes are composed of mixed dimensionality meaning that the entities both have the same text string values "D" and "F" but not in reference to the same dimensions.

FIG. 13 depicts an administrator user interface that allows the administrator to configure a variety of parameters related to the computation of the complementary difference recommendations, including the subset of nodes to be included in the analysis, the subset of dimensions to be included, individual weighting of each dimension, and target ranges for the composite output scores.

FIG. 21 is another exemplary user interface having fields that can be updated by a user to add or modify attributes on a dimension by dimension basis that are associated with data elements in the database in accordance with the present disclosure.

DETAILED DESCRIPTION

Figure 1:
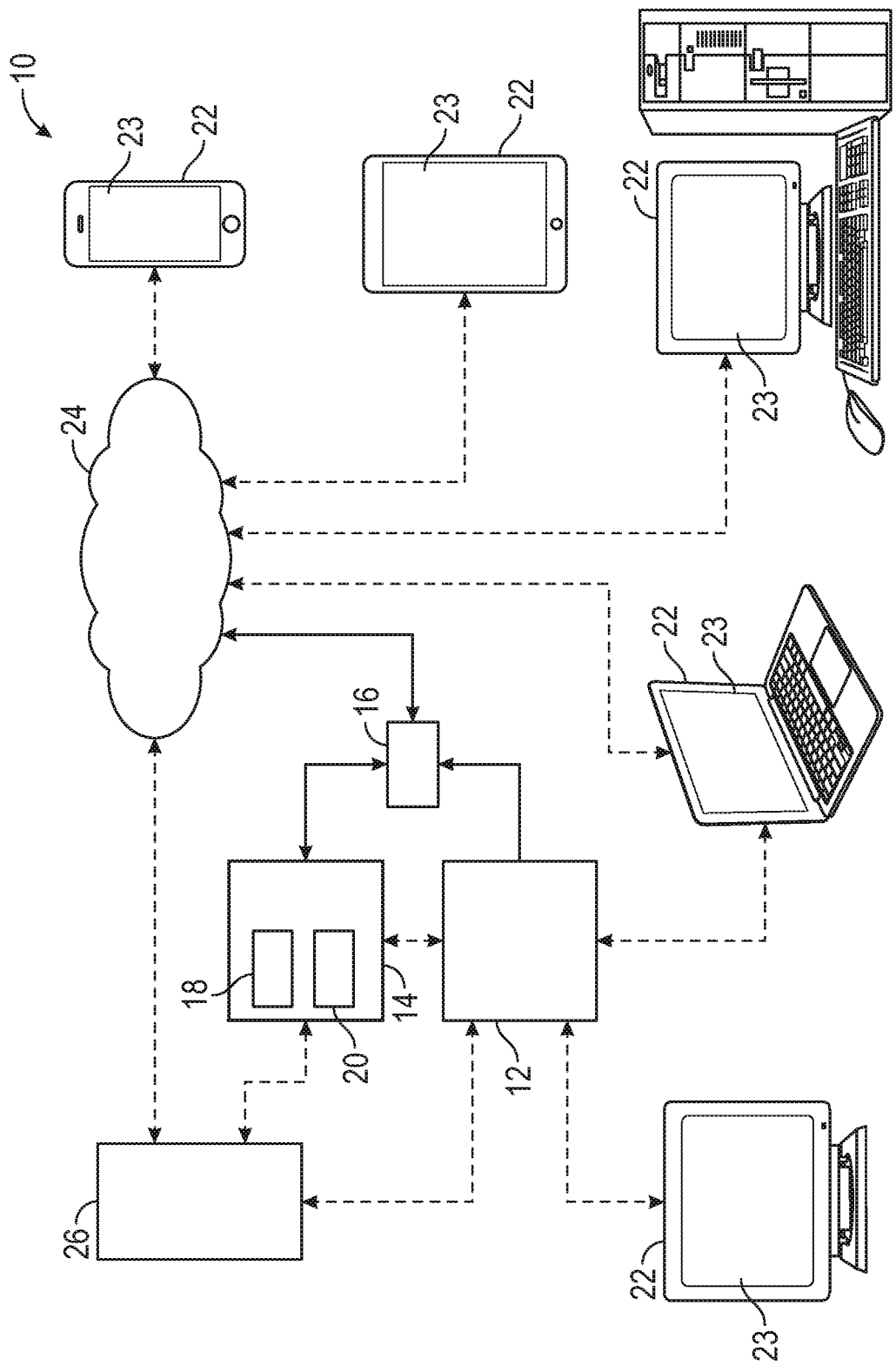
FIG. 1 is a schematic of an exemplary computer implemented system in accordance with the present disclosure.

Before explaining at least one embodiment of the disclosure in detail, it is to be understood that the disclosure is not limited in its application to the details of construction, experiments, exemplary data, and/or the arrangement of the components set forth in the following description or illustrated in the drawings unless otherwise noted.

The disclosure is capable of other embodiments or of being practiced or carried out in various ways. For instance, although recommendations to promote collaboration between researchers may be used as an example, the methods and systems may be used to automatically assess and provide recommendations for other purposes, such as dating, or the like. Also, it is to be understood that the phraseology and terminology employed herein is for purposes of description, and should not be regarded as limiting.

As used in the description herein, the terms "comprises," "comprising," "includes," "including," "has," "having," or any other variations thereof, are intended to cover a non-exclusive inclusion. For example, unless otherwise noted, a process, method, article, or apparatus that comprises a list of elements is not necessarily limited to only those elements, but may also include other elements not expressly listed or inherent to such process, method, article, or apparatus.

Further, unless expressly stated to the contrary, "or" refers to an inclusive and not to an exclusive "or". For example, a condition A or B is satisfied by one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more, and the singular also includes the plural unless it is obvious that it is meant otherwise. Further, use of the term "plurality" is meant to convey "more than one" unless expressly stated to the contrary.

As used herein, qualifiers like "substantially," "about," "approximately," and combinations and variations thereof, are intended to include not only the exact amount or value that they qualify, but also some slight deviations therefrom, which may be due to computing tolerances, computing error, manufacturing tolerances, measurement error, wear and tear, stresses exerted on various parts, and combinations thereof, for example.

As used herein, any reference to "one embodiment," "an embodiment," "some embodiments," "one example," "for example," or "an example" means that a particular element, feature, structure or characteristic described in connection with the embodiment is included in at least one embodiment and may be used in conjunction with other embodiments. The appearance of the phrase "in some embodiments" or "one example" in various places in the specification is not necessarily all referring to the same embodiment, for example.

The use of ordinal number terminology (i.e., "first", "second", "third", "fourth", etc.) is solely for the purpose of differentiating between two or more items and, unless explicitly stated otherwise, is not meant to imply any sequence or order or importance to one item over another or any order of addition.

The use of the term "at least one" or "one or more" will be understood to include one as well as any quantity more than one. In addition, the use of the phrase "at least one of X, V, and Z" will be understood to include X alone, V alone, and Z alone, as well as any combination of X, V, and Z.

Circuitry, as used herein, may be analog and/or digital components, or one or more suitably programmed processors (e.g., microprocessors) and associated hardware and software, or hardwired logic. Also, "components" may perform one or more functions. The term "component," may include hardware, such as a processor (e.g., microprocessor), an application specific integrated circuit (ASIC), field programmable gate array (FPGA), a combination of hardware and software, and/or the like. The term "processor" as used herein means a single processor or multiple processors working independently or together to collectively perform a task.

Software may include one or more computer readable instructions that when executed by one or more components cause the component to perform a specified function. It should be understood that the algorithms described herein may be stored on one or more non-transitory computer readable medium. Exemplary non-transitory computer readable mediums may include random access memory, read only memory, flash memory, and/or the like. Such non-transitory computer readable mediums may be electrically based, optically based, and/or the like.

Shown in FIG. 1 is an exemplary computer system 10 that can be used to implement the inventive concepts described herein. The computer system 10 may comprise one or more computer processor 12, one or more non-transitory memory 14, and one or more communication component 16. The memory 14 may store one or more database 18 and program logic 20. The one or more database 18 may comprise the data elements, dimension, and data attributes discussed herein. Though it will be understood that the data elements, dimensions, and/or data attributes may be provided from outside sources and/or stored elsewhere. The computer system 10 may bi-directionally communicate with a plurality of user devices 22 and/or may communicate via a network 24. The user device 22 in general, includes one or more processors (not shown), an output device 23, a wired or wireless communication port (not shown) configured to communicate with the network 24, and one or more computer input devices (not shown), such as a keyboard, microphone, mouse, touchpad, touchscreen or the like. The user device 22 can be implemented in a variety of forms, such as a desktop computer system, a tablet computer system, a smart phone, or the like. The processor 12 or multiple processors 12 may or may not necessarily be located in a single physical location. The term "output device" includes any computer screen or other visual output, including projectors, flat panel screens, LCD screens, LED screens and otherwise that provide visual output from a computer.

In one embodiment, the memory 14 stores program logic 20, for example, a set of instructions capable of being executed by the one or more processor 12, that when executed by the one or more processor 12 causes the one or more processor 12 to carry out a recommendation algorithm in which data elements stored in the database 18 are analyzed on a dimension by dimension basis to provide recommendations of links between the data elements.

In one embodiment, the network 24 is the Internet and the user devices 22 interface with the system 10 via the communication component 16 and a series of web pages. It should be noted, however, that the network 24 may be almost any type of network and may be implemented as the World Wide Web (or Internet), a local area network (LAN), a wide area network (WAN), a metropolitan network, a wireless network, a cellular network, a Global System for Mobile Communications (GSM) network, a code division multiple access (CDMA) network, a 3G network, a 4G network, a 5G network, a satellite network, a radio network, an optical network, a cable network, a public switched telephone network, an Ethernet network, combinations thereof, and/or the like. It is conceivable that in the near future, embodiments of the present disclosure may use more advanced networking topologies.

In one embodiment, the computer system 10 comprises a server system 26 having multiple servers in a configuration suitable to provide a commercial computer-based business system such as a commercial web-site and/or data center.

In accordance with the present disclosure, it is been found that with respect to researchers, that relative amounts of common attributes and different attributes may affect how well the researchers may innovate together. Having certain attributes in common assist the researchers and communicating together. Having certain different attributes assist the researchers in developing new and innovative ideas. Referring now to FIG. 2, shown therein are three Venn drawings 40a, 40b, and 40c for pairs of data elements 42a and 42b; 44a and 44b; and 46a and 46b for a single dimension. The Venn drawings 40a, 40b, and 40c show all possible logical relations between a finite collection of different sets. In this case, the sets include the attributes for data elements 42a and 42b, 44a and 44b, and 46a and 46b. Each of the data elements 42a and 42b, 44a and 44b, and 46a and 46b represent an entity that could be either a person or non-person entity. In the Venn drawings 40a, 40b, and 40c, portions of the data elements 42a and 42b, 44a and 44b, and 46a and 46b that overlap represent commonality across a single dimension and the non-overlapping portions represent differences across the same dimension.

With respect to the data elements 42a and 42b, FIG. 2 shows the data elements 42a and 42b having a relatively small amount in common, and a relatively large amount of difference. In this case, low innovation potential exists through complementary difference between the two entities represented by the data elements 42a and 42b due to too little in common.

With respect to the data elements 44a and 44b, FIG. 2 shows the data elements 44a and 44b having a relatively large amount in common, and a relatively small amount of difference. In this case, low innovation potential exists through complementary difference between the two individuals represented by the data elements 44a and 44b due to too much in common.

With respect to the data elements 46a and 46b, FIG. 2 shows the data elements 46a and 46b having a relatively large amount in common, and a relatively large amount of differences. In this case, high innovation potential exists through complementary difference.

Figure 3:
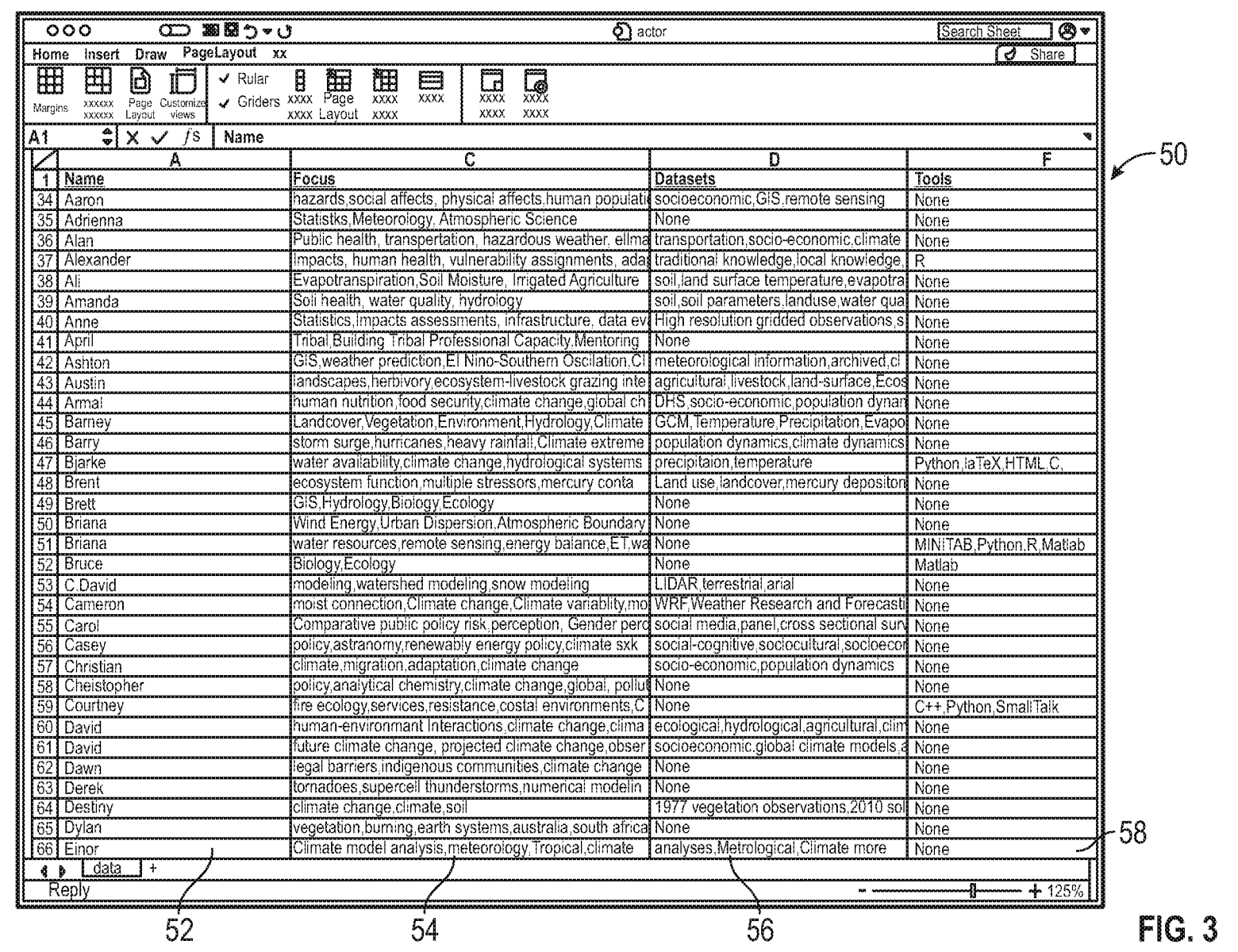

Referring now to FIG. 3, shown therein is a spreadsheet 50 of data from the database 18 having a listing of individuals in a first column 52 and three dimensions. The first column 52 includes a unique identifier of each of the individuals. Although a name is used as the unique identifier in column 52, it should be understood that other types of identifiers could be used such as a unique string of numbers or a social security number. Particular rows within the spreadsheet 50 include a plurality of dimensions, e.g., three dimensions, for each individual. In this example, a first dimension is arranged and stored in a second column 54; a second dimension is arranged and stored in a third column 56; and a third dimension is arranged and stored in a fourth column 58. The first, second, and third dimensions include attributes describing the individuals on a dimension basis. In this example, the first dimension includes attributes indicative of "focus"; the second dimension includes attributes indicative of "data sets"; and the third dimension includes attributes indicative of "tools" that the particular individuals are familiar with. In this example the individual named Aaron (row 34) has a technical focus on hazards, social affects, physical affects, and human population; is familiar with socioeconomic, GIS, and remote sensing data sets, and is not familiar with any particular tools. Although only three dimensions are shown herein for purposes of example, it should be understood that more than three dimensions can be used and analyzed by the relationship algorithm described herein. Further, it can be seen in FIG. 3 that a first data element in the database 18 representing the individual Aaron, for example, is categorized with the first attribute of the first dimension, the first dimension being an aspect of a situation, problem or thing. In this case, the first dimension represents the technical focus of the individual Aaron. It can also be seen that a second data element in the database 18 representing the individual Adrienne, for example, is also categorized with a second attribute of the first dimension. In this case, Adrienne's technical focus is statistics, meteorology, and atmospheric science. The first data element representing Aaron is also categorized with a first attribute of a second dimension, i.e., in this case datasets. The second dimension is different from the first dimension, and, in the case of Aaron includes attributes such as socioeconomic, GIS, and remote sensing. The second data element representing Adrienne, includes a second attribute, i.e., none, of the second dimension representing datasets. While this spreadsheet contains a list of attributes on people it should be understood that non-person entities could be represented in a similar manner.

Figure 4A:
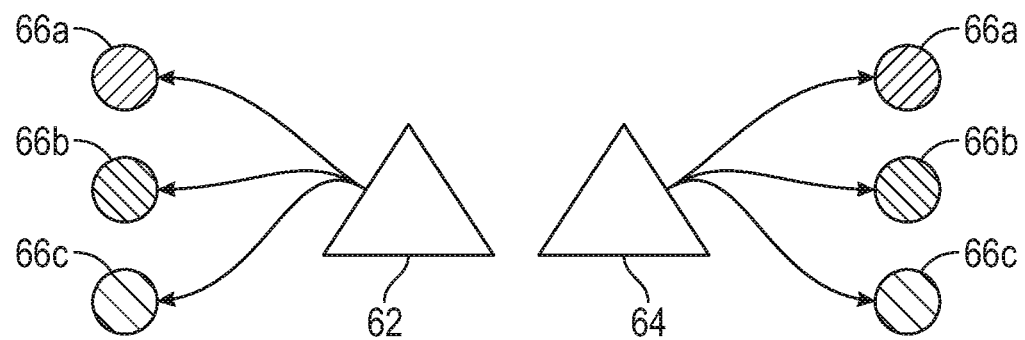
FIG. 4A is a network diagram of two data elements having three dimensions that are completely dissimilar resulting in a low innovation potential, which is also referred to herein as a low complementary difference score.
Figure 4B:
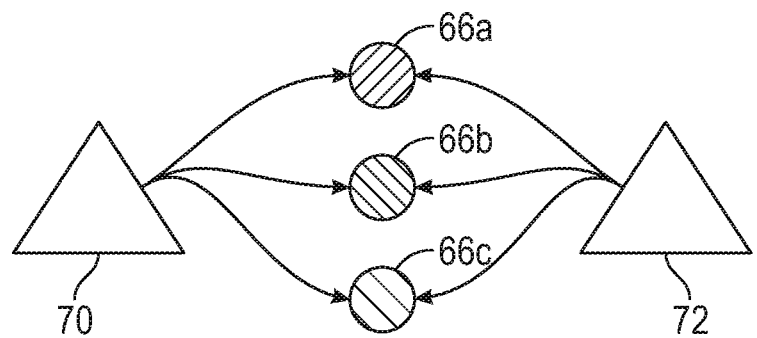
FIG. 4B is a network diagram of two data elements having three dimensions that are completely similar resulting in a low complementary difference score.

Referring to FIGS. 4A and 4B, the complementary difference score can be calculated by calculating a score for each dimension. This can be accomplished in various ways, such as a function of attributes in common count, and attributes difference count, e.g., common count/total count. The complementary difference score, e.g., combined score, can be calculated as a function of the dimension scores and the dimension count. This can be accomplished using a formula such as $\text{Min}(\text{Mean}(D_s)*(D_c/2),1)$ where $D_s$ is a dimension score, and $D_c$ is a dimension count, however other formulas could be used. For example, some dimensions may be more important in a particular use-case than others, and the formula could include individual weight coefficients on each dimension. In another case the formula could be modified to use different statistical functions instead of the mean and calculate numeric attributes differently than non-numeric attributes. It is also possible to replace the function with a more advanced computation model generated by machine learning or a similar technique. The model could be created based on a training dataset of the performance of previous groups of entities in the database in order to produce a score predictive of the output measure of interest. In this case it is possible that the score may become reflective of something other than complementary difference. In this way the current disclosure is capable of implementing multi-dimensional recommendations of phenomena other than just complementary difference, allowing the scoring algorithm to evolve as the research on innovation evolves, or to be applied to areas other than innovation facilitation.

The innovation potential score, which may also be referred to herein as a combination of dimension scores, e.g., a combined score, may be represented on a scale from 0 to 1, for instance, in which an innovation potential score, for instance, of 0 indicates 100% differences, an innovation potential score, for instance, of 1 indicates 100% similarity. When represented on a scale from 0 to 1, an innovation potential score of 0.5 indicates a best level, e.g., an optimal balanced ratio of similarity and difference. Although a scale of 0 to 1 will be described herein by way of example, with an optimal score being 0.5, it should be understood that other scales, scores, and target values can be used consistent with the present disclosure.

FIG. 4A illustrates a network diagram of two data elements 62 and 64. The data element 62 is described by three dimensions 66a, 66b, and 66c. The data element 64 is also described by three dimensions 66a, 66b, and 66c. As shown in FIG. 4A, the data element 62 has attributes of the dimension 66a that are completely different from the attributes of the dimension 66a for the data element 64. Similarly, the attributes for the dimensions 66b and 66c are also completely different. Due to the dissimilarity of the dimensions 66a, 66b, and 66c, the data elements 62 and 64 have combined score of zero, resulting in a low innovation potential via complementary difference.

FIG. 4B is a network diagram of two data elements 70 and 72 having three dimensions 66a, 66b, and 66c that are completely similar resulting in a combined score of one, also resulting in a low innovation potential via complementary difference.

Figure 5:
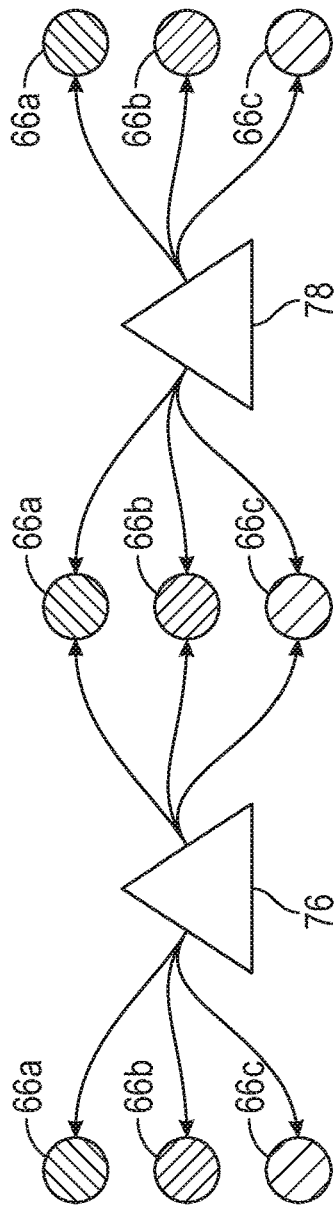
FIG. 5 is a network diagram of two data elements having attributes of three dimensions in common and other attributes of the three dimensions not in common, resulting in a higher innovation potential, which is also referred to herein as a higher complementary difference score than the network diagrams of FIGS. 4A and 4B.

FIG. 5 is a network diagram of two data elements 76 and 78 having attributes of three dimensions 66a, 66b, and 66c in common and other attributes of the three dimensions 66a, 66b, and 66c not in common, resulting in a higher combined score of 0.5 than the network diagrams of FIGS. 4A and 4B.

Figure 6:
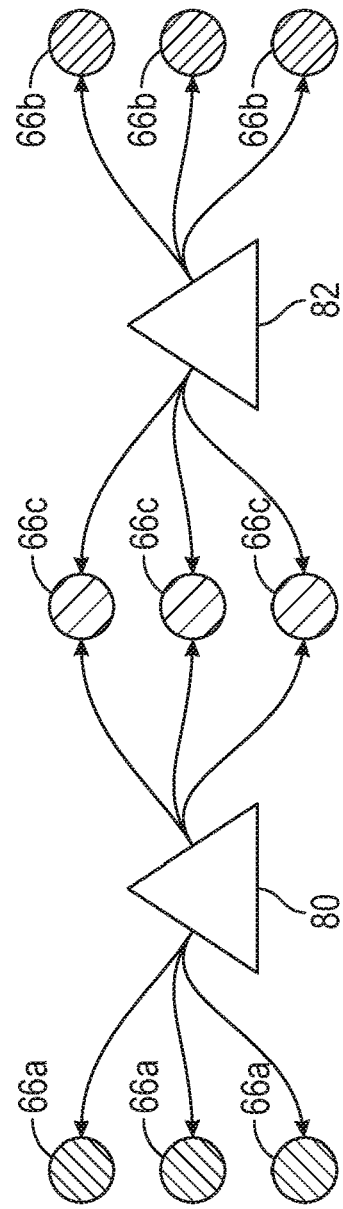
FIG. 6 is a network diagram of two data elements having attributes of one dimension in common and other attributes of two dimensions not in common, resulting in a higher complementary difference score than the network diagrams of FIGS. 4A and 4B, and the same complementary difference score of FIG. 5 but for different reasons.

FIG. 6 is a network diagram of two data elements 80 and 82 having attributes of one dimension 66C in common and other attributes of two dimensions 66a, and 66b not in common, also resulting in a higher combined score of 0.5, than the network diagrams of FIGS. 4A and 4B, but the same combined score as FIG. 5 due to different alignment across dimensions. The complementary difference calculation could be implemented to take into account these different modes of alignment, leading to a weighting of the score based on the characteristic of the dimensions included.

Figure 7:
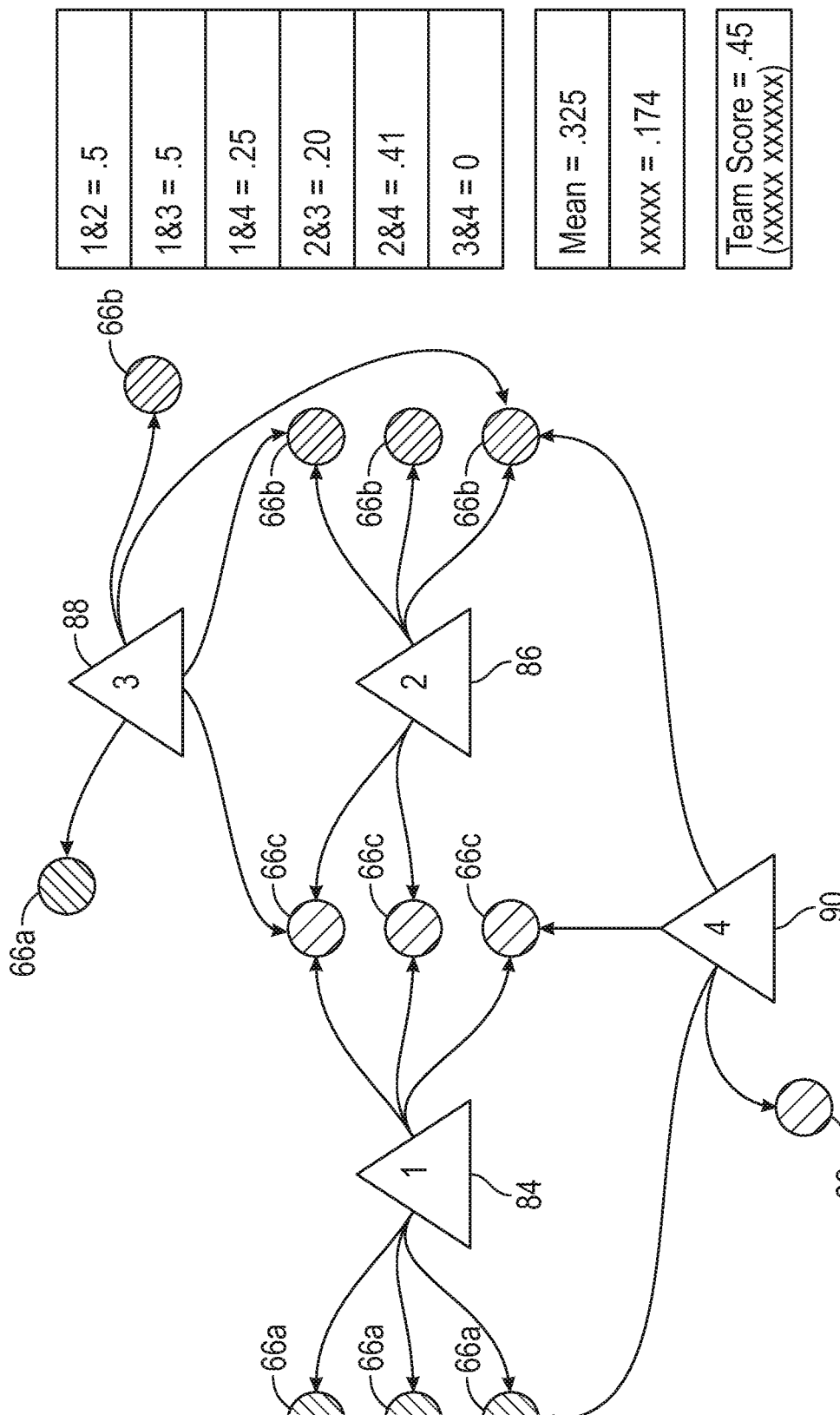
FIG. 7 is a network diagram of four data elements representing a team of either person or non-person entities, showing a composite complementary difference score for the whole team based on the individual complementary difference scores of each possible pair of elements within the team.

FIG. 7 is a network diagram of four data elements 84, 86, 88 and 90, representing either person or non-person entities, showing a dimensional comparison of attributes resulting in a team score indicative of the team's complementary difference. The team score can be calculated as a function of descriptive statistics on all pairwise scores. Similar to the multiple options for the computation method described for FIGS. 4A and 4B, the computation of the team score could be similarly modified. For example, some dimensions may be more important in a particular use-case than others, or some types of pairs within the team may be more important than others, and the computation could include individual weight coefficients on each dimension or on each pair or type of pair as defined by attributes and/or properties on the entities and/or properties of the edges connecting the pair. In another case the formula could be modified to use different statistical functions instead of the mean and standard deviation. In another case, the formula could employ different methods of pairwise calculation based on attributes about each pair or the edges that connect each pair. It is also possible to replace the team calculation with a more advanced computation model generated by machine learning or a similar technique. The model could be created based on a training dataset of the performance of previous groups of entities in the database in order to produce a score predictive of the output measure of interest. In this case it is possible that the team score may become reflective of something other than combined complementary difference. In this way the current disclosure is capable of implementing multi-dimensional recommendations of phenomena other than just complementary difference, allowing the scoring algorithm to evolve as the research on innovation evolves, or to be applied to areas other than innovation facilitation.

Figure 8:
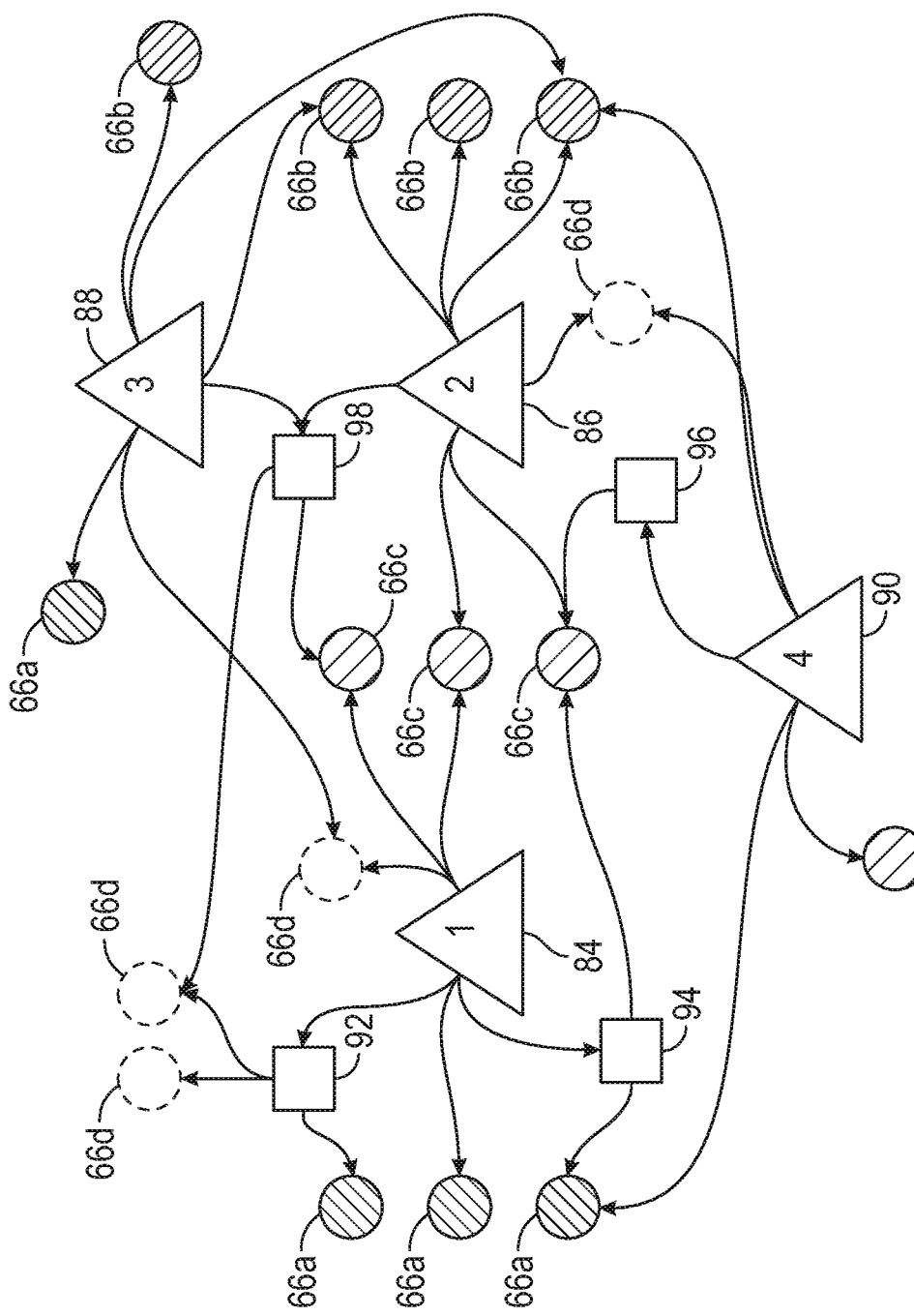
FIG. 8 is another network diagram of the four data elements representing the team of FIG. 7 in which additional data elements representing artifacts are included in the network diagram in order to show that an attribute about a data element may be the result of an indirect connection as well as the result of a direct connection.

FIG. 8 is another network diagram of the four data elements 84, 86, 88, and 90 representing either person or non-person entities of FIG. 7 in which additional data elements 92, 94, 96, and 98 have been added to the graph to show how an entity may be modeled to have attributes for particular dimensions based on indirect connections instead of only through direct connections. For example, in FIG. 7 entity 90 was directly connected to an attribute associated with dimension 66c, but in FIG. 8 entity 90 is connected to the same attribute on dimension 66c through entity 96. The calculation of pairwise scores can take these intermediate elements into account, condensing them down to direct connections between elements and attributes. In these cases, the calculation of score can take into account a number of hops required to reach attributes of particular dimensions, or the properties of the elements traversed through those hops, to affect the score. Not all dimensions available in the data need to be incorporated into the team calculation. The reference numeral 66d represents a dimension that contains attributes linked to data elements present in the team that are not included in the calculation of team score.

Figure 8C:
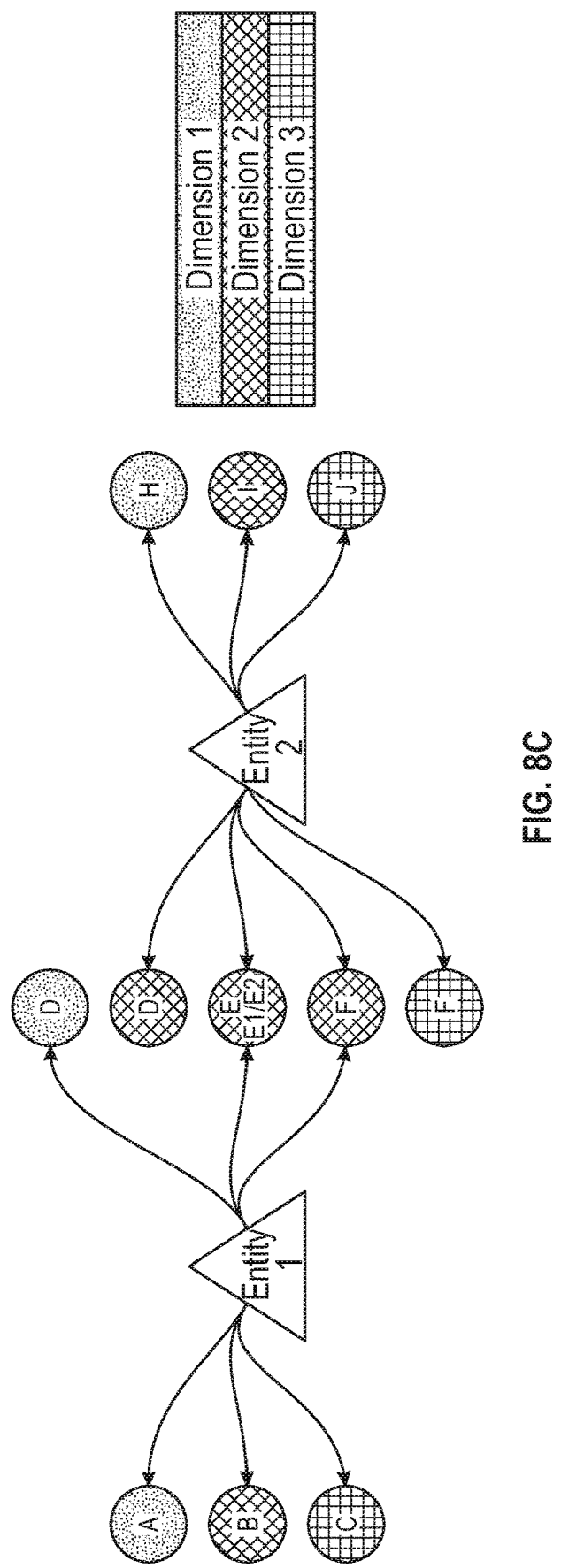
FIG. 8C is yet another network diagram of the two data elements of FIG. 8A and FIG. 8B having the mixed dimensions resolved by separating the shared values of "D" and "F" into separate nodes that differentiate value "D" for dimension 1 vs value "D" for dimension 2 and value "F" for dimension 2 vs. value "F" for dimension 3.

FIG. 8A is another network diagram showing two data elements (entity 1 and entity 2) and 9 attribute values, with no dimensionality assigned to the attributes. In this network diagram, each entity has 3 unique attribute values and 3 shared attribute values. Without the concept of dimensionality, the matching of attribute value is the only criteria required to establish commonality. For example, entity 1 and entity 2 both have values "D", "E", and "F", which establishes commonality. It's possible that "D" is the value 142, but for entity 1 (a person entity) that value represents the number of dollars in the person's bank account and for entity 2 (a non-person entity representing a book) that value represents the book's number of pages. Similarly, attribute "F" could be the value "Junior" but for entity 1, "F" could be the person's name suffix and for entity 2, "F" could represent the target audience. Despite having the same values, these attributes do not represent commonality. FIG. 8B shows how the addition of dimensionality resolves this issue by establishing 3 dimensions and shading each attribute value based on which dimension the attribute value belongs to. Attributes D & F are shaded to represent that the attributes D & F are composed of values of mixed dimensionality—meaning that entity 1's value "D" is the same text string as entity 2's but refers to a different dimension. Similarly, entity 1 and entity 2 values for F are the same textually, but not the same dimensionally. FIG. 8C makes this distinction more explicit by replacing the single node D and single node F in FIG. 8B with two nodes of value D, one on dimension 1 and one on dimension 2, and two nodes of value F one on dimension 2 and one on dimension 3. With this representation, entity 1 and entity 2 have commonality only along dimension 2 through value E, and not through values D & F as in FIG. 8A. This process of disambiguation (making ambiguous attribute values not ambiguous by separation into unique nodes) results in an inherently different network structure than the network structure that had no dimensionality (FIG. 8A). FIG. 8A showed 2 entities with 3 unique attributes and 3 common attributes, resulting in a unique-to-common ratio of 0.5. Applying dimensionality in the manner shown in FIG. 8C results in 2 entities with 5 unique attributes and only 1 common attribute, a unique-to-common ratio of 0.17. It is important to recognize that there are multiple valid dimensional mappings possible over a given network, each possibly resulting in different network structures. For example, if dimension 2 represented "restaurants" but was then broken down more granularly into 50 distinct dimensions representing restaurants for each US state, it then becomes possible that entity 1 and entity 2 no longer share attribute E in common if they are not each referring to the same restaurant in the same state. Similarly, dimension 1 and dimension 2 could be combined into a single higher order dimension leading to D nodes becoming shared again, as in FIG. 8A, but with the F nodes remaining distinct. This shows the importance of dimensionality regarding its ability to affect the presently disclosed recommendation algorithm that looks for network patterns to determine recommendations.

Figure 9:
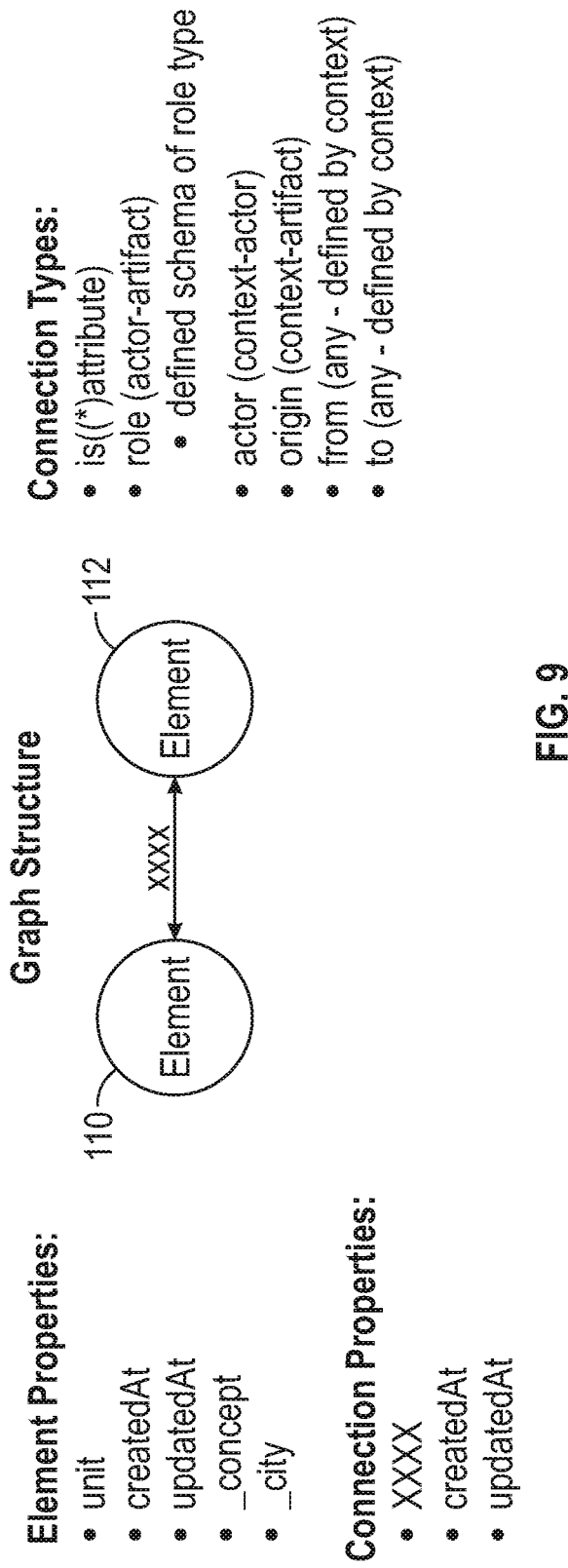
FIG. 9 is a graph diagram showing that the edge relationship between two data elements can have its own metadata associated with the edge in order to support different types of edges and additional properties on the edge.

FIG. 9 is a graph diagram showing two data elements 110 and 112 that are linked together with an edge. This edge can represent any of an arbitrary number of connection types which establish the context of the relationship between the two nodes. Exemplary contextual relationships include a type of relationship (e.g., brother, sister, father, co-worker or the like), is (e.g., data element representing a car may include a link to the word red to indicate that the car is a red car), collaboration suggestion, links, connects, or composes. The data elements, in general, can represent an actor, an attribute, or an artifact, and can be linked together with any appropriate contextual relationship. Thus, data elements representing an actor and an artifact, e.g., a book, can be linked together to indicate that the actor has the book. Or, the artifact, i.e., book, can be linked to an attribute, such as a title of the book. Likewise, data elements indicating an actor and an attribute can be linked together.

Figure 10:
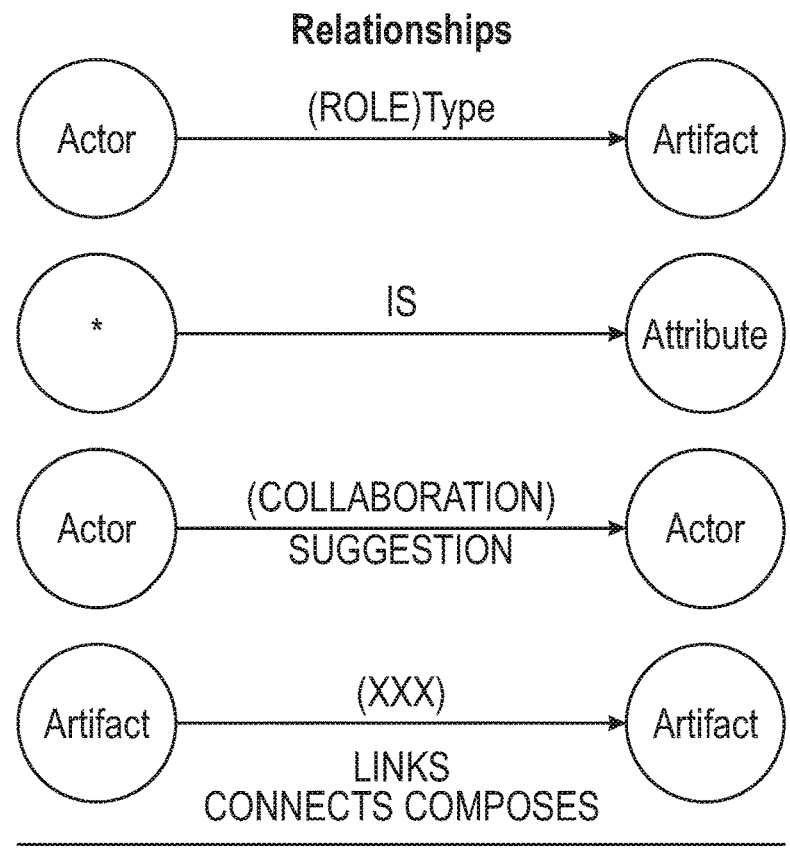
FIG. 10 is another graph diagram showing that different types of data elements can be connected together through different types of edges to form a graph data model.

FIG. 10 is another graph diagram showing three types of data elements (i.e., actor, artifact, and attribute), in accordance with the present disclosure, as well as a plurality of different types of contextual relationships between the data elements to form a graph data model.

Figure 11:
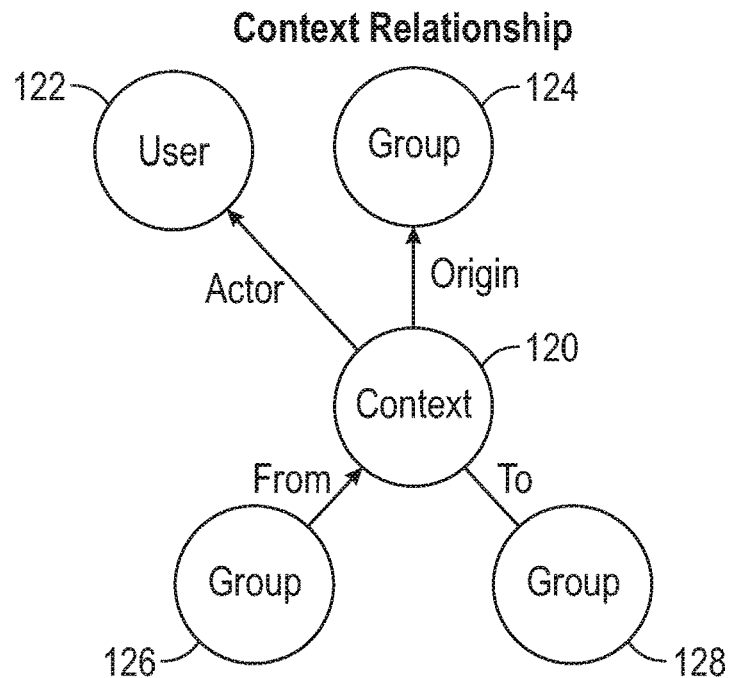
FIG. 11 is a graph diagram showing how an edge between two nodes can be transformed via reification to become a "context" node instead of an edge, with properties of the edge relationship encoded as additional nodes connected to the reified context node.

Sometimes it is difficult to represent the full context associated with the relationship between two nodes only with a single edge. In these cases, the edge can be reified, which means the edge is replaced with a node that the original source node links to and the original target node links from. Once the contextual connection is modeled as a node instead of an edge, the node can then be linked to as many additional nodes as necessary to accurately represent the context of the relationship between the original source and target nodes. FIG. 11 is a graph diagram showing an example of a reified connection in which context node 120 has replaced a direct connection between source node 126 and target node 128, which are identifiable as the original source and target nodes due to the "from" and "to" edges that connect them to the context node 120. In addition, nodes 122 and 124 show the ability to attach additional nodes to the context node 120 that contain additional information about the nature of the edge the context node 120 is replacing.

Figure 12:
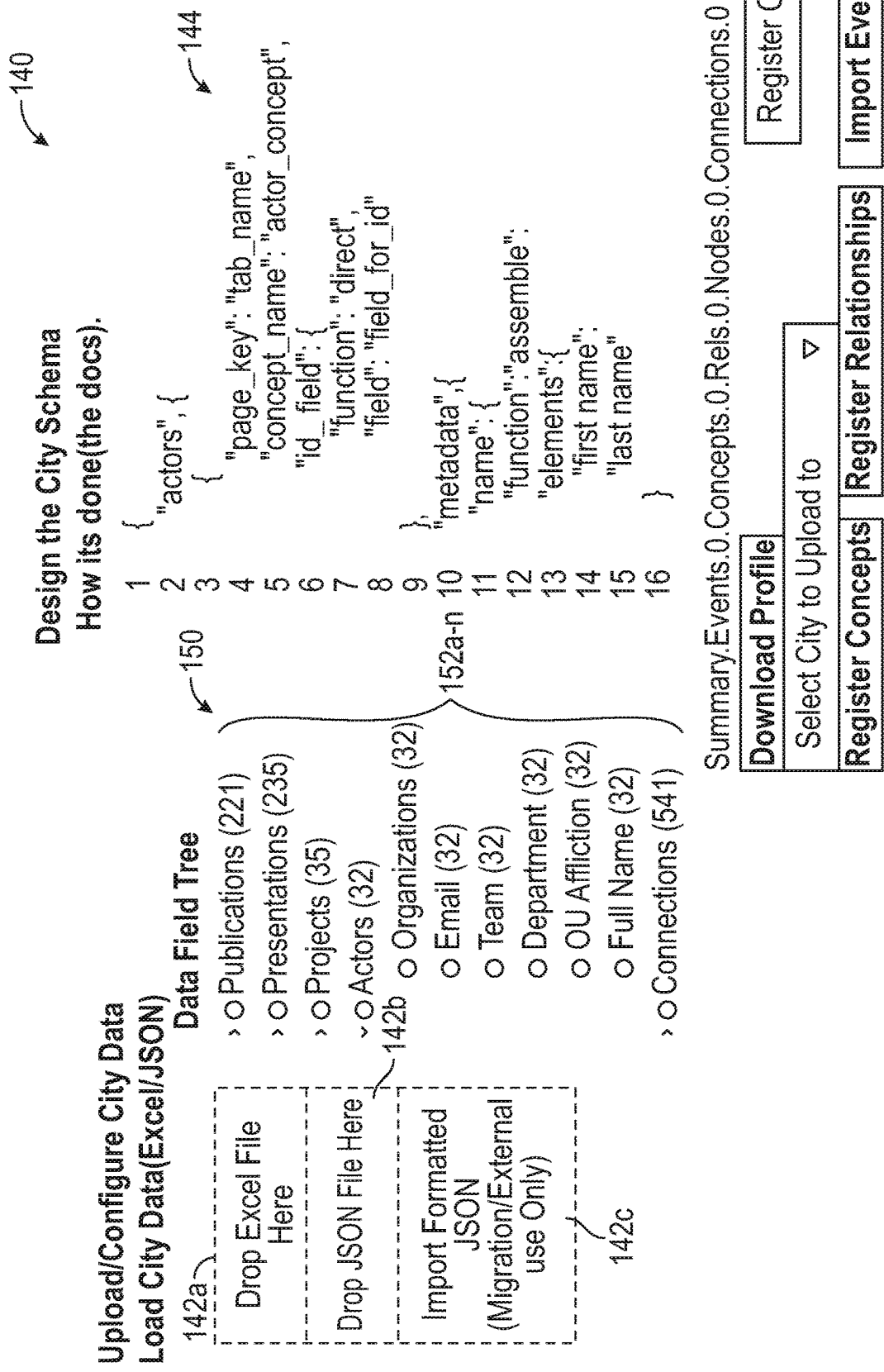
FIG. 12 depicts a user interface that allows the computer system to receive data from a variety of different sources, like the excel file shown in FIG. 3, combined with a schema mapping configuration, in order to transform the incoming data into a graph data model in accordance with the present disclosure.

FIG. 12 depicts a user interface 140 which may be displayed on the output device 23 of one of the user devices 22 that allows a user to upload multi-dimensional data into the database 18 of the computer system 10. This permits the database 18 to receive data from a variety of different sources and in a variety of different file formats, including the sample Excel file shown in FIG. 3, and then transform the incoming data, via a configurable mapping 144, into a graph model suitable for use by the recommendation algorithm. For example, the user interface 140 includes multiple fields 142a, 142b, and 142c to allow computer input into the database 18. The term "field" means a location for computer data input and/or output of a value having at least one corresponding associated place in computer memory. The term "computer input" means data, information and/or signals provided by a computer user. This may include numbers, words, mouse clicks, "enter", check boxes, dialog boxes, and otherwise. In this example, the fields 142a, 142b, and 142c are regions displayed on the output device 23 that can be selected by the user using an input device, such as a mouse or touchscreen. Once any of the fields 142a, 142b, or 142c are selected, a datafile can be identified and/or input by the user. The user interface 140 includes configuration mapping 144 associated with the fields received through 142a, 142b, or 142c that control how the system processes the datafile provided by the user to transform data within the datafile into a graph format, and then upload the graph formatted data into the database 18. In some embodiments, the configurable mapping 144 can be modified and/or customized for a particular dataset before the computer transforms the datafile into the graph format. In this instance, the user interface 140 may also be provided with a data tree region 150 to permit the user to view the incoming data and determine the appropriate mapping to be implemented via the configurable mapping 144. The data tree region 150 may include a plurality of fields 152a-n to permit the user to select and configure how the data will be uploaded into the database 18.

FIG. 13 depicts an administrator user interface 160 which may be displayed on the output device 23 of one of the user devices 22 that allows an administrator of the system 10 to configure parameters related to the complementary difference computation and the generation of recommendations. This allows the administrator to define a subset of entities, a subset of dimensions, assign weights to favor some dimensions in the calculation of the score over others, and define target scores. The user interface 160 could include many more fields to allow the administrator to adjust additional aspects of the computation method, or to replace the default method with their own custom computer code. The system 10 does not impose a limitation on the number of suggestion configurations that can be run, allowing an administrator to create multiple different suggestion configurations to illuminate different types of recommendations. The user interface 160 does not need to be limited to administrator access only, and in some embodiments could be provided directly to the user to allow the user to customize specific recommendations of interest to the user or create new recommendations of interest.

Figure 14:
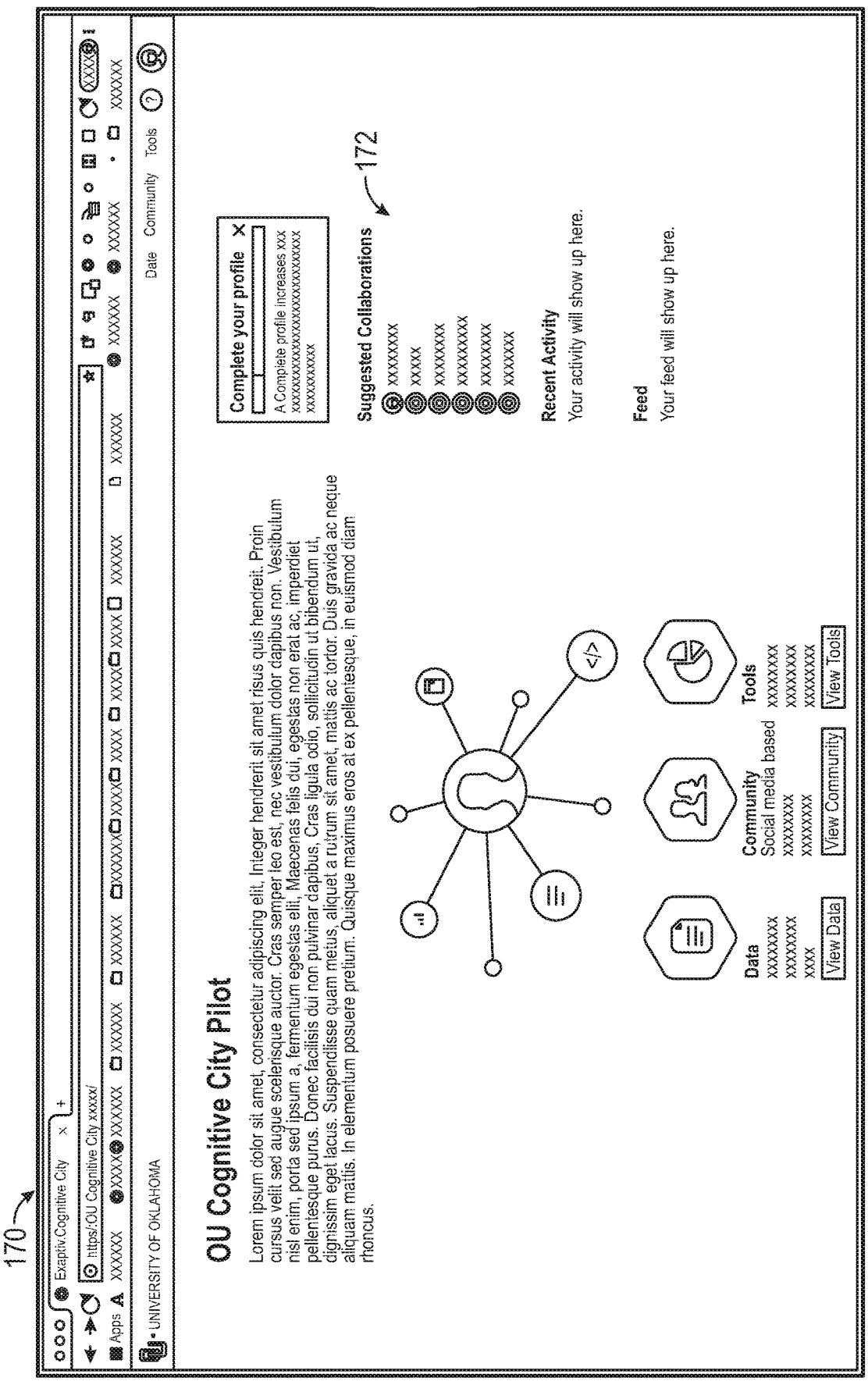
FIG. 14 is an illustration of a user interface showing a list of recommended collaborators, as generated based on a recommendation configuration like shown in FIG. 13, ranked in the order from highest complementary difference score to lowest complementary difference score.

FIG. 14 is an illustration of a user interface 170 displayed on the output device 23 of one of the user devices 22 that displays a textual list 172 of recommended collaborators, ranked in order from best to least. The textual list 172 can be displayed in other forms, such as a graph format. Further, the textual list 172 can be ordered in other manners, such as from least to best. The textual list 172, in this example, is provided with six potential collaborators, but can be extended to show a different number. In this example, the user interface 170 can be supplied with code permitting each of the six potential collaborators to be selected with computer input, and then to be provided with further information regarding similarities and differences (preferably on a dimensional basis) of individual attributes of the collaborators to allow the user to explore why the potential collaborators were recommended to the user. The user interface 170 may also be provided with one or more fields with associated computer instructions to allow the user to search the database 18 for potential collaborators that were not recommended by the recommendation algorithm. Once a list (not shown) of potential collaborators that were not recommended is displayed, the user may select individual collaborators to view the similarities and differences to explore why the potential collaborators were not recommended. This information can be supplied in a text-based form, a graph-based form, or other form. In this example the recommendations shown are of person entities (collaborators) but since the system 10 may be agnostic to whether data elements are person or non-person entities, the user interface 170 could render lists 172 of non-person recommendations as well, such as articles with complementary difference. The user interface 170 is also not limited to containing a single list of recommendations and could render multiple recommendation lists, each associated with a different configuration of the scoring method, as provided in FIG. 13.

Figure 15:
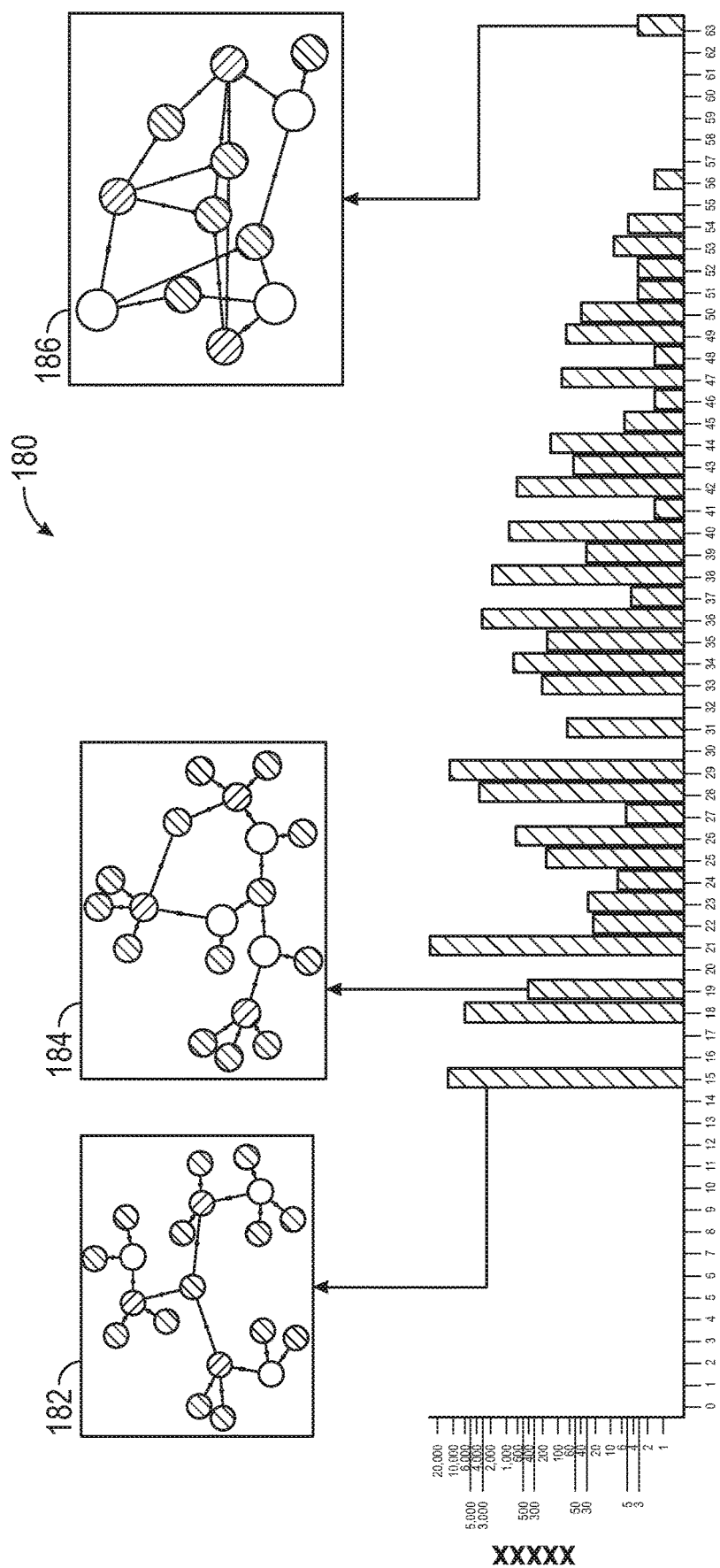
FIG. 15 is a chart showing a histogram of the distribution of complementary difference scores generated by a recommendation algorithm applied to a data set containing 143 researchers and 143 research artifacts and configured to recommend three-person teams in accordance with the present disclosure.

FIG. 15 is a chart 180 which may be displayed on the output device 23 of one of the user devices 22 that allows the user to see aggregated results of the recommendation algorithm when applied to a data set that has a large number of combinatorial possibilities for team assembly. The example shown in FIG. 15 is based on running the complementary difference method on a dataset comprised of 143 researchers, 143 research projects, and 4 dimensions—two dimensions related to the researchers and two dimensions related to the research projects. The recommendation system may be configured to recommend three-person teams in accordance with the present disclosure. In this example, there are 477,191 possible 3 person teams from a pool of 143 people. This large solution space is difficult for a user to explore without some form of aggregation, sorting, and visualization. In this example, the output of the recommendation algorithm was limited based on attribute criteria to show approximately 60,000 of the 477,191 possible teams, and the exemplary histogram was generated to show the distribution of scores across the teams. The complementary difference score was normalized to provide the recommendations on a scale from zero to one-hundred where zero indicates an undesirable collaboration team due to complementary difference scores being either too low or two high, as discussed in FIG. 2, and one-hundred indicates a desirable collaboration team with scores representing an equal balance between commonality and difference. In this example, the chart 180 is a bar chart, although the chart 180 can be represented in other formats. Further, the chart 180 may be provided with computer executable code that permits selection of one or more of the teams represented by the bars, and display of a graph showing (on a dimensional basis) similarities and dissimilarities of the team members. In this example, three bars have been selected, which represent three different ranges of scores from low to high and an example of one of the team networks from the group represented by the bar is shown. Graph 182 shows an example of a team with a low score—it can be seen that there is little in common except the central node. Graph 184 shows an example of a team with a slightly higher score than 182, and the graph connectivity is consistent with this. Graph 186 shows an example of 1 of the 2 teams that received a score of 63, which has a network structure quite different from the examples pulled from lower scoring groups.

Figure 16:
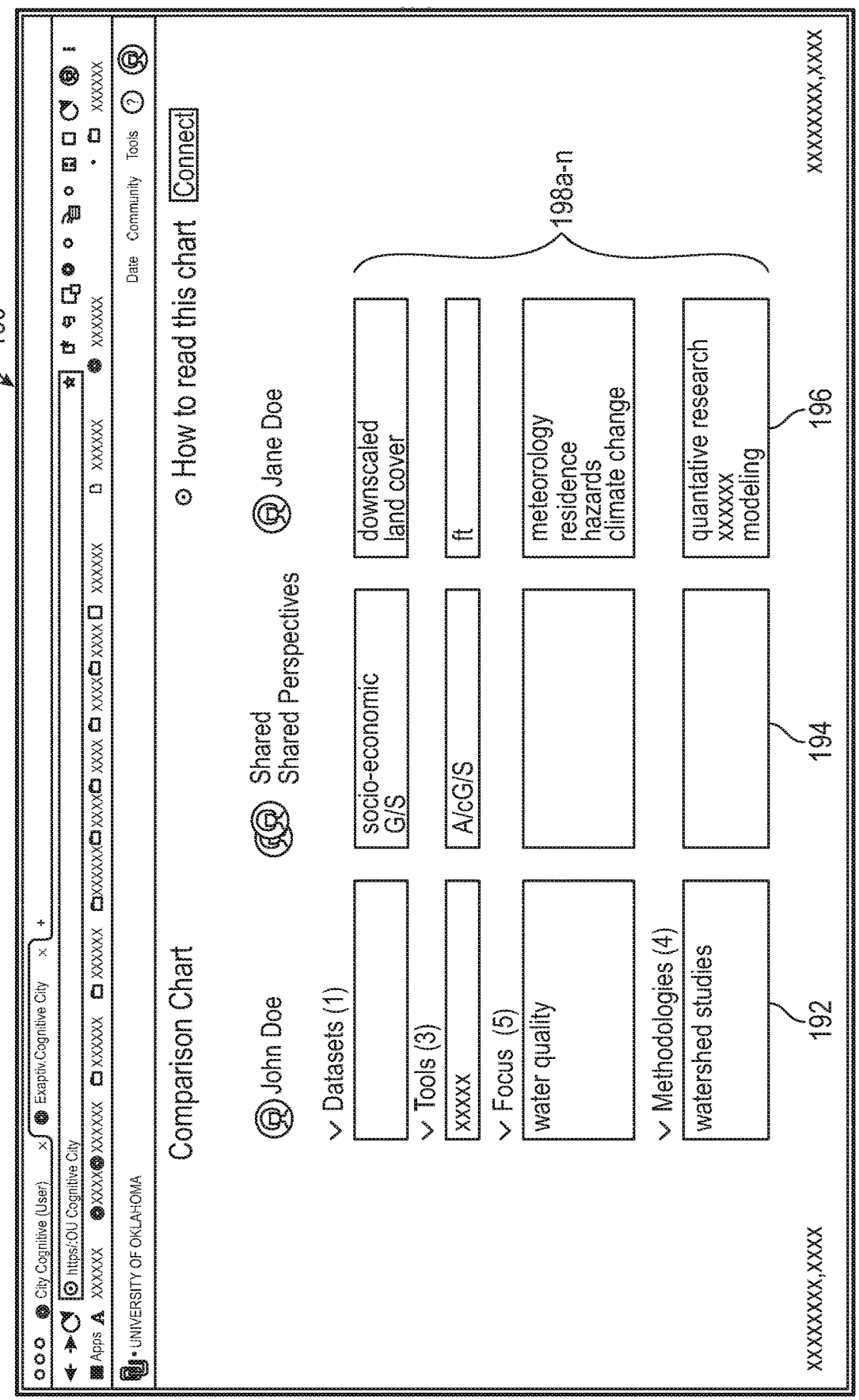
FIG. 16 depicts a user interface showing the overlapping attributes and unique attributes, on a dimension by dimension basis, of two potential collaborators (a particular pair of data elements within the database) that were recommended by the recommendation algorithm.

FIG. 16 depicts a user interface 190 which may be displayed on the output device 23 of one of the user devices 22 that allows the user to explore information regarding a particular recommendation. Because recommendations can receive the same score for different reasons, as shown in FIGS. 5 and 6, in some embodiments, it may be important that the system 10 contain visualizations and interfaces that allow a user to explore the recommendations in order to understand why the recommendations were recommended. In this case, the user interface 190 a plurality of fields which can be arranged to include three columns 192, 194, and 196 and a plurality of rows 198 a-n. Each of the rows 198a-n is grouped in accordance with the dimension those rows relate to. Data regarding differences of one of the potential data elements is displayed in the fields of the column 192 on a dimension by dimension basis. Data regarding similarities of the two data elements is displayed in the fields of the column 194. Data regarding differences of the other data element is displayed in the fields of the column 196. This user interface 190 includes allows similarities and dissimilarities to be explored by a user to further understand the complementary difference potential between the two elements. This user interface 190 can be used to explore pairs of person or non-person elements, or pairs that contain one person and one non-person element. The user interface 190 may include an input mechanism to allow the user to not only explore pairs that were recommended by the system 10, but also can be used to explore pairs that weren't recommended by the system 10. The input mechanism may allow the user to modify or select parameters, buttons, checkboxes or the like. The implementation shown in FIG. 16 is a 3-column list view, but could also be implemented with a variety of other visualization techniques like a network diagram.

Figure 17:
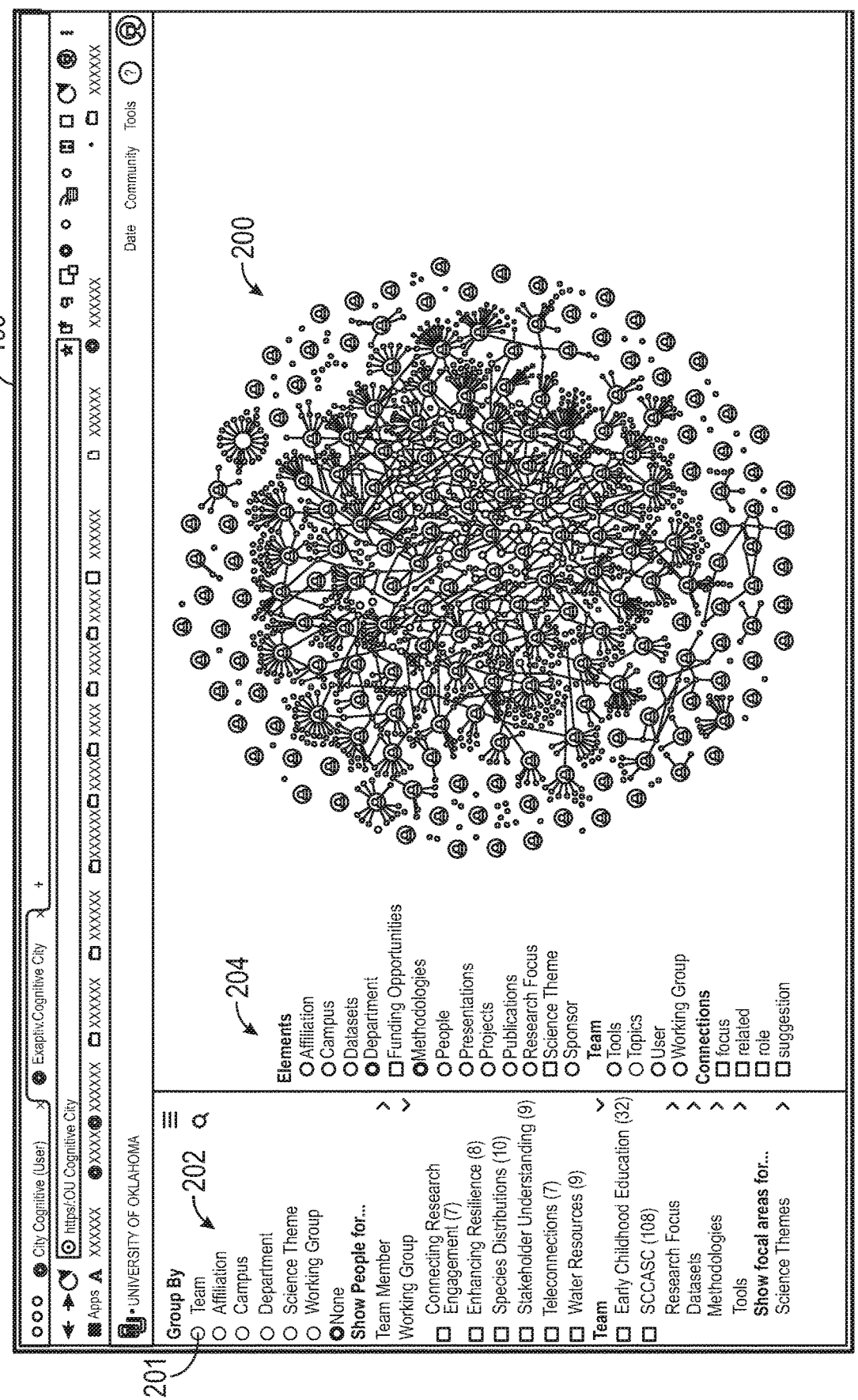
FIG. 17 is a network visualization that shows an interactive graphical representation of artifacts, actors, and attributes in the database with the network visualization being projected from the information in the database, and not necessarily being a graph of all the information in the database.

FIG. 17 is a user interface 199 having a network visualization 200 which may be displayed on the output device 23 of one of the user devices 22 that shows a graphical representation of a subset of the data elements present in the database 18 and a subset of the dimensionality that relates the data elements to each other or to other data elements. The network visualization 200 is being projected from the information in the database 18, and is not necessarily a graph of the information in the database 18. The network visualization 200 may perform operations such as reification and dereification on the underlying network data so that the resultant network visualization 200 contains a different number of nodes and/or edges than the source network data. The network visualization 200 may use values of the attributes of the nodes and edges to data-drive visual channels of the network visualization 200 such as the color, size, opacity, shape, icon, etc. of the nodes and edges. This network visualization 200 can be based upon a configurable mapping, as taught within U.S. Patent Publication No.

20140244623 (U.S. Pat. No. 10,530,894), the entire content of which is hereby incorporated herein by reference. The network visualization 200 can be tailored to the manner in which the particular users would like to view the data within this network visualization 200, and the system 10 may not impose any limits on the number of visualizations that can be configured to provide users access to different exploratory views. The network visualization 200 may be a dynamic, interactive user interface that can be driven by user input. The user interface 199 may include one or more parameter 201 within panels 202 or 204, or the network itself that permit user interaction with the system 10. Not all of the parameters 201 have been labeled for purposes of clarity. Further, the network visualization 200 can be visualized in a number of ways including a scatter plot, a word cloud, or the like.

Figure 18:
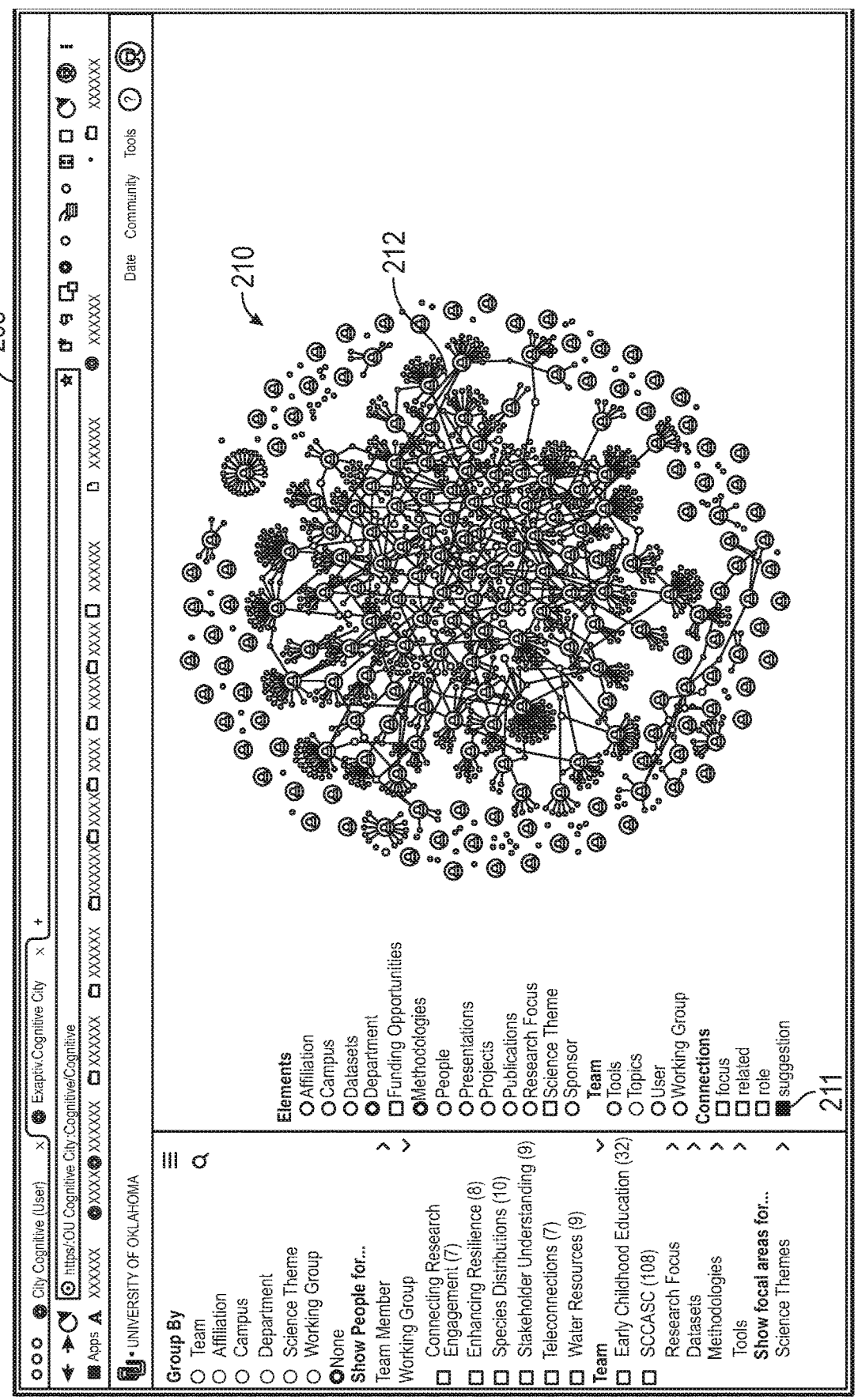
FIG. 18 is another interactive network visualization being the graphical representation of FIG. 17 having complementary difference recommendations inserted as additional edges into the graph of artifacts, actors, and attributes in accordance with the present disclosure.

FIG. 18 is another user interface 208 that is constructed similarly to the user interface 199, having a network visualization 210 displayed on the output device 23 of one of the user devices 22 where the user has selected through interaction with a parameter 211 that suggestions related to a particular configuration of the recommendation algorithm are incorporated into the network. This causes additional edges 212 related to recommendations to be added to the network visualization 210. The network visualization 210 supports layering multiple recommendation results into the same visualization, allowing for the exploration of different scenarios. Visual channels of the recommendation edges can be used to reflect different attributes of the recommendations, such as making recommendations with higher scores wider, more opaque, or a different color. The network visualization 210 uses edge lines 212 to represent recommendations but other types of visualization could be implemented.

Figure 19:
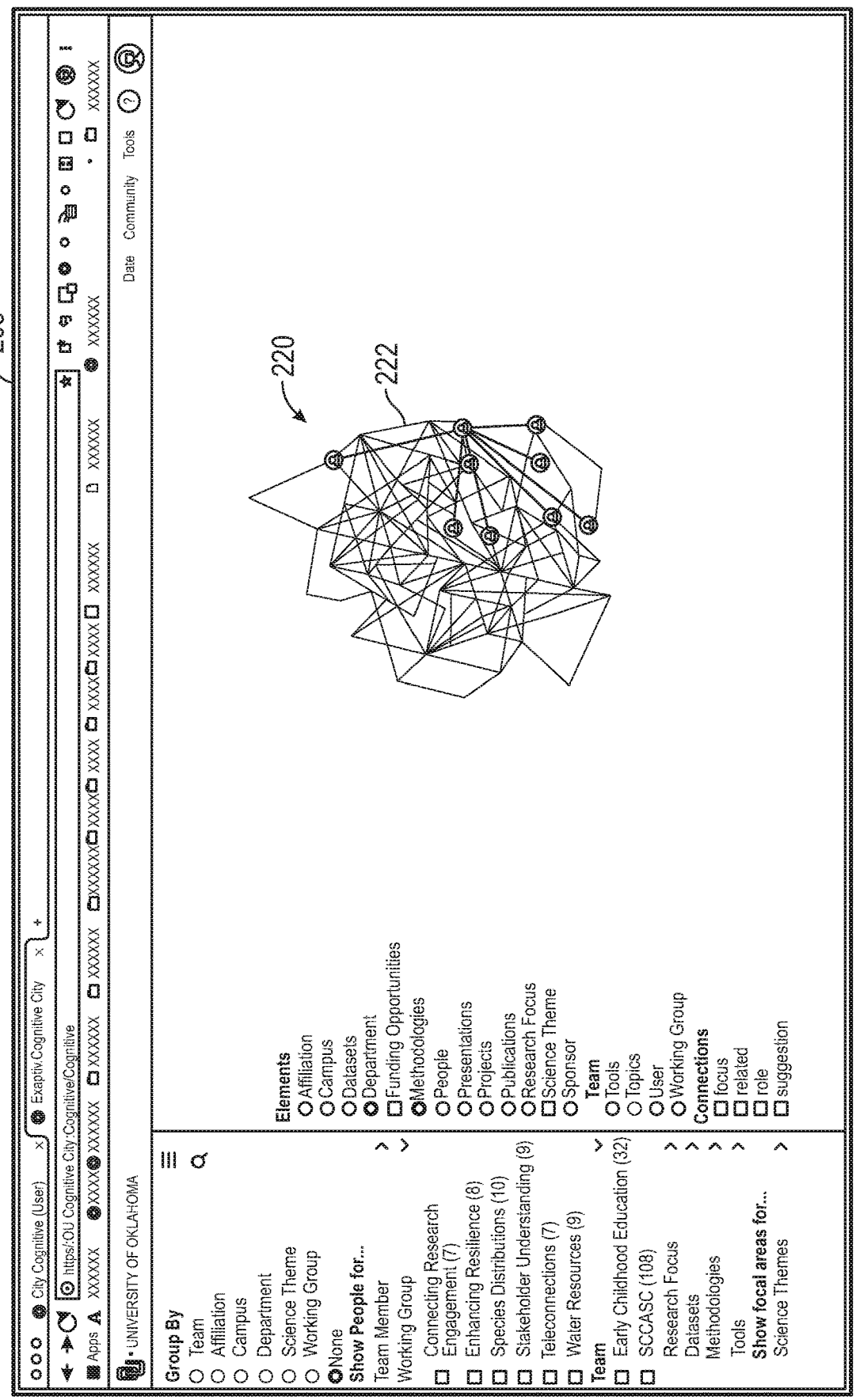
FIG. 19 shows a subset of the interactive network diagram of FIG. 18 as a result of a user interacting with the interactive network diagram of FIG. 18 to select a particular entity of interest and explore the suggested collaborators for that node based on visual rending of complementary difference scores as edges.

FIG. 19 is an example of the user interface 208 of FIG. 18 being used interactively by a user to generate a network visualization 220. In this example, the user has selected a particular node in the network visualization 210, resulting in only the nodes that are recommended for collaboration with that node to be highlighted within the network visualization 220, along with such node's recommendation edges 222, while the rest of the network is faded out. This is just one example of the type of user interaction possible to support exploration of recommendations. Similar exploratory techniques can be implemented using visualization techniques other than a network diagram, such as a Sankey diagram, list view, scatter plots, etc.

Figure 20:
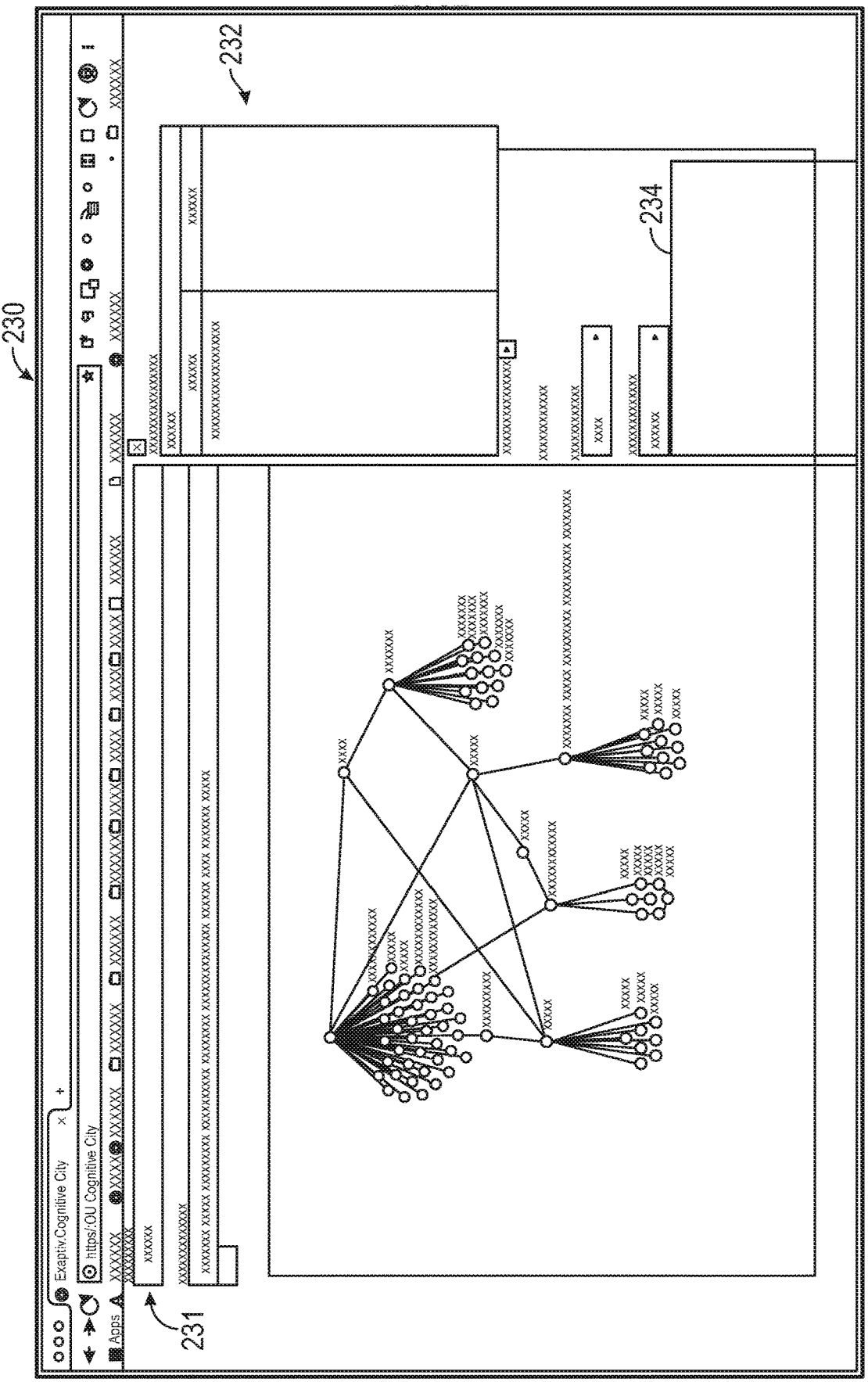
FIG. 20 is another exemplary user interface in accordance with the present disclosure in which users can select data elements and dimensions to iteratively build their own team of person or non-person elements based upon their implicit knowledge of the entities and/or with the assistance of recommendations in accordance with the present disclosure.

FIG. 20 is another exemplary user interface 230 which may be displayed on the output device 23 of one of the user devices 22 that allows the user to select data elements and build their own teams of either person or non-person entities or combinations of person and non-person entities. Selection boxes 231 in the upper left corner of the user interface 230 allow the user to select particular data elements of interest and particular dimensions of interest. The selected items are added to the network diagram incrementally, as the user makes selections. This allows for the user to build teams based on their implicit knowledge of the entities involved instead of relying on system recommendations. On the right side of the user interface 230 the system 10 provides a number of user interface tools 232 to augment the human task of team assembly. This includes, in the top right, helping the user see the data dimensions available in the database on the entities they have added beyond just the dimensions they have identified, so that the user can decide if they want to incorporate additional relationships into their manually built team model. It also includes, in the bottom right, a selection field 234 providing the ability for the user to request assistance from the system 10 to find data elements that fulfill particular criteria for the team they are assembling or bridge structural holes in the network they have built so far. This functionality engages a computation engine 280 (See FIG. 22) of the system 10 to help the user choose from the potentially very large set of possible additions to their team the data elements that shift the overall score of the team they are building in their desired direction. The user interface 230 may include one or more fields allowing computer input and associated code to use the computer input to search the database 18 to retrieve information regarding certain actors, attributes, or artifacts and display information indicative of similarity and dissimilarity so that teams having complementary amounts of similarity and dissimilarity can be built, and may include fields that engage other types of computation to help the user characterize the team they are building with regard to characteristics other than just complementary difference.

FIG. 21 is another exemplary user interface 240 displayed on the output device 23 of one of the user devices 22 having fields that can be updated by the user to add or modify attributes and/or dimensions associated with data elements in the database 18 in accordance with the present disclosure. One use case for the user interface 240 is to serve as a "profile page" which allows a user to curate the attributes associated with the data element that represents their own account. Another use case for the user interface 240 is as a profile page for non-person elements that allow users to curate the attributes of all the data elements in the database 18 on a dimension by dimension basis.

The data within the database 18 can be updated dynamically as the data for attributes and dimensions change, or as new records of data elements are added to the database 18, or existing records of data elements are removed. The data within the database 18 can be updated dynamically using various tools, for example, that write data back into the database 18. The recommendation algorithm may be run ad-hoc in response to user requests, or may be scheduled to run periodically on a substantially consistent basis to dynamically analyze pairs of data elements and larger teams of data elements in the database 18 as the data in the database 18 changes. This can provide new recommendations that reflect new innovation opportunities as a result of data changing though user activity in the system 10.

Figure 22:
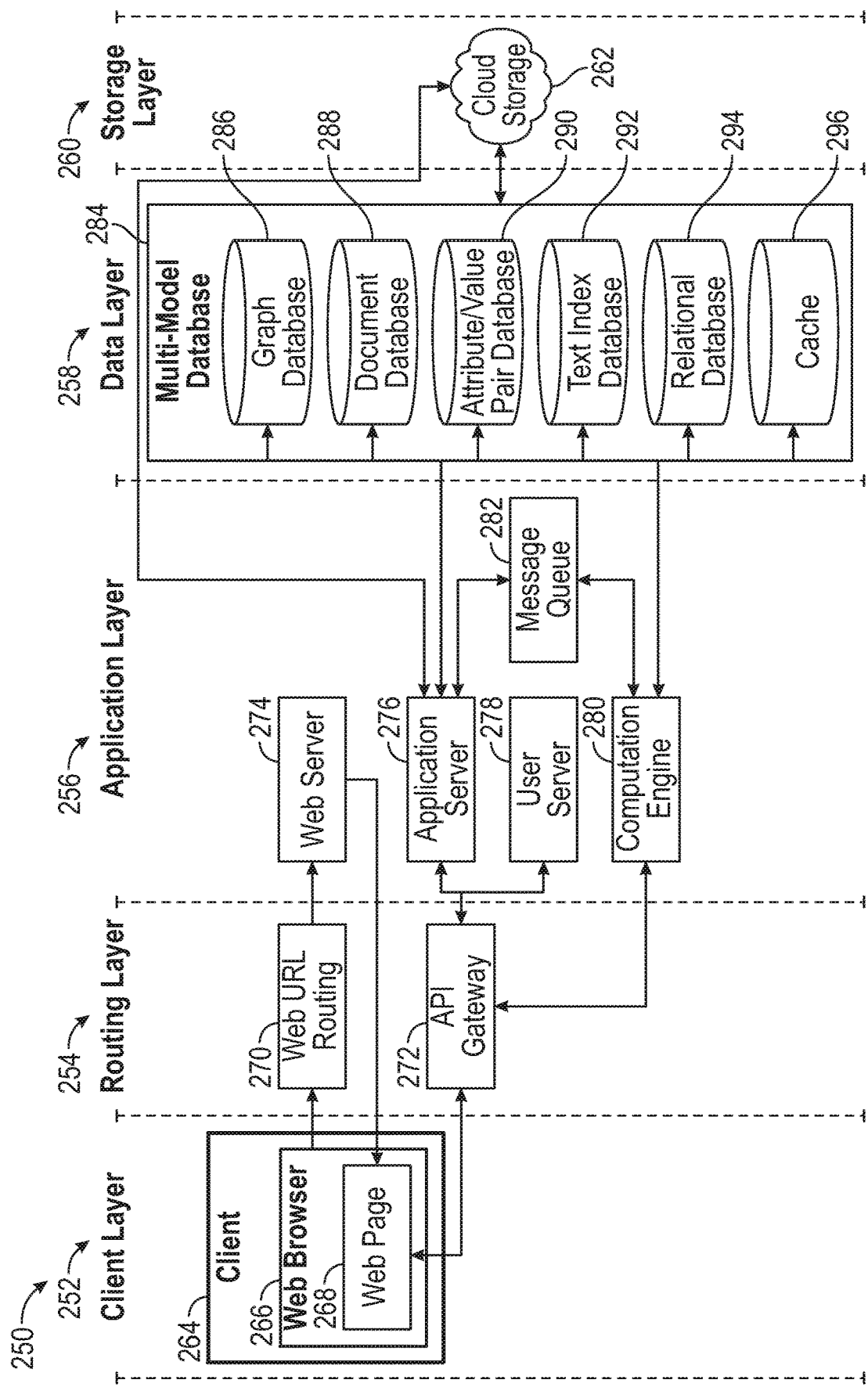
FIG. 22 is a software architecture diagram showing an exemplary architecture of the computer system described herein.

FIG. 22 shows an exemplary 5-tier software architecture 250 of the computer system 10 described herein. The architecture 250 shown is designed to be run via a web-based client/server architecture, which is one of the compatible formats of FIG. 1. As discussed in FIG. 1, this architecture 250 could be implemented as a non-web-based client/server architecture with either a thin or thick client implementation. This architecture 250 adheres to a standard three-tier, front-end/middle-tier/back-end software architecture, with the addition of an explicit layer shown for the routing between the client and the server and the separation of a storage layer for large data artifacts from the more structured and granular data layer. One skilled in the art will recognize that the it is possible to either compress the tiers in this architecture, for example combining the data and application layers into a single back-end layer, or separate the individual components of the application or data layers to create more granular back-end layers that would allow for easier scaling of the system via either scale-out or scale-up approaches.

The Client Layer 252 encapsulates the front-end functionality of the system 10, meaning the visual user-interface components as well as any computational components that must run on the client either to optimize performance (by incurring the overhead of a round trip to the server) or manage client state. The client layer 252 communicates with a Routing Layer 254. The Routing Layer 254 encapsulates the mechanisms by which the client is able to locate necessary server resources. This routing layer 254 is implemented using web DNS technology, allowing the client to reach an Application Layer 256. The Application Layer 256 encapsulates all of the server-side algorithmic functionality of the invention as well as the capability to deliver resources to the client based on requests and to update data in a Data Layer 258 or Storage Layer 260 with new data that is provided by the user or is the result of computation.

The Data Layer 258 encapsulates all of the server-side database functionality described herein. It is distinct from the Storage Layer 260 in that the purpose of the data layer 258 is to model the data and provide support for performant queries and analysis based on those models, not to store large data artifacts. Those artifacts are stored in the Storage Layer 260, with the Data Layer 258 simply holding pointers to the locations of those artifacts in the Storage Layer 260.

The Storage Layer 260 supports the storage of large data objects not otherwise suitable for storage directly in one of the databases contained within the Data Layer 258. In many cases it improves performance and scalability to store pointers in the Data Layer 258 that reference locations in the Storage Layer 260 where large data artifacts are stored. This might include documents, images, videos, etc. In the implementation shown in FIG. 22, the Storage Layer 260 is implemented in network storage 262 often referred to as the cloud, but it could also be implemented as non-cloud-based storage technology, as long as the Application Layer 260 is able to access the storage 262. Optionally, the Data Layer 258 may have direct access to the Storage Layer 260 to create a more permeable boundary between the two layers 258 and 260 if the databases want to push artifacts to storage or pull artifacts from storage into the databases without going through the Application Layer 260.

The client layer 252 may be provided with an application client 264, which runs a web browser 266, that is configured to display a web page 268. The application client 264 may be a personal computer like a desktop or laptop, or a mobile device, or any system capable of communicating with the server and rendering information to the user and receiving input from the user. Because the invention implements a rich set of application programming interfaces (APIs), the client "user" need not be a human being. For instance, the client user may be another software system.

Because the architecture 250 adheres to a standard web-based architecture, the client uses the web-browser 266 to interact with a web server 274 of the application layer 256. The web browser 266 uses http or https protocols to request a page from the web server 274, and then executes code within the returned webpage 268. The web page 268 is code that is returned from the web server 274 based on a request from the client web browser 266. That code is then executed within the web browser 266, which in turns communicates further with the web server 274 via API gateway 272 in the routing layer 254. The web page 268 code may also redirect the web browser 266 to a different server web page 268a, resulting in the execution of different code.

The web browser 266 requests web pages 268 from the web server 274 via URL(s) 270 which are resolved to IP addresses associated with web servers 274 able to return the requested web page 268. The presently disclosed inventive concepts use standard DNS resolution to support the routing of web URLs 270.

The web page 268 code communicates with web servers 274 via API (application programming interface) calls in the API gateway 272 which perform specific functions. The web page 268 requests the execution of these server-side functions via URLs which must be resolved to addresses associated with web servers 274 able to perform the requested action. The presently disclosed inventive concepts use standard DNS resolution to support the routing of API endpoints.

The web server 274 is a repository of all the web pages 268 that can be requested by the client 264 and has the capability to serve the web pages 268 upon request. Application logic is implemented via an Application Server 276 which the client 264 is able to communicate directly with via API calls through the API gateway 272. The Application Server 276 is also able to communicate directly with the web server 274, a user server 278, a computation engine 280, and a message queue 282 that perform more specialized functions, as well as with the data layer 258 and the storage layer 260. The Application Server 276 communicates with the User Server 278 when it needs to perform operations related to users, such as identify management, authorization, and authentication. If the Application Server 276 needs to run a computation task, it can either perform it directly or outsource it to the Computation Engine 280. To support performance and scalability of the computation system 10, the Application Server 276 requests work from the Computation Engine 280 via messages placed in the Message Queue 282. The Computation Engine 280 monitors the Message Queue 282 and pulls jobs off the message queue 282 as they are detected. Once a job is complete, the Computation Engine 280 uses the message queue 282 to return results to the Application Server 276. This loosely coupled message architecture could be replaced with a more tightly coupled architecture that either has the Application Server 276 communicate directly with the Computation Engine 280 or has the Application Server 276 run all computation itself.

The Computation Engine 280 provides performance and scalability to the system 10 by providing a separate server for performing computationally intensive operations. The preferred method for the Computation Engine 280 to communicate with the databases in the Data Layer 258 is through the API 272, but the Computation Engine 280 may also be configured to talk directly to Multi-Model Databases 284 in the data layer 258 when desired.

The presently disclosed inventive concepts require the ability to analyze data from a variety of different perspectives. To support these perspectives, different models of the data are built. Specific database technologies exist to support specific types of data models but there is no single database technology that is equally optimized or designed to support all models simultaneously. Because of this, the system 10 uses a "multi-model" approach in which a number of different database technologies are used in parallel to support different models of the same data that are able to take advantage of the specific features of the database technology made for that specific data model. The application server 276 creates an abstraction layer around these multiple databases so that they appear like a single database that is able to answer a wide variety of questions about the underlying data based on different modeling approaches. The particular implementation shown in FIG. 22 contains 5 different databases in support of 5 different types of data models and 1 cache database for fast storage and retrieval of analysis results, but this architecture can be scaled to include additional data models and the database technologies that support those models. In FIG. 22 there is depicted a one-to-one relationship between the data model included in the system and the database technology used to implement that model, for example a single graph database and a single relational database that each support a graph data model and relational data model respectively, but this isn't a requirement of the implementation. The system 10 could use multiple graph models for example, that have schemas optimized to support different data models, or multiple relational databases with different schemas, etc. Similarly, a particular database technology could be used to implement a data model not native to that database format. A relational database can be used to implement a graph data model, for example, or a document database can be used to implement a relational model. The purpose of matching database technology to data model is to achieve optimal performance of the overall system by using a technology that offers specific features for working with particular model forms.

A Graph Database 286 provides optimized support for a graph data model. A "graph" is the mathematical term for a network structure of "nodes" connected together via "edges" that link them. Both nodes and edges have properties that define them and may belong to namespaces that allow for a single large graph to be segmented into a set of smaller sub-graphs. The graph may contain both data and metadata—data about the data. That is, the graph may have information about the skills a particular person has (data) and may also have information about the relationship between those skills, for example, that one is a more specific form of the other, and may have information about the nature of the "has skill" connection between the user and the attribute (metadata). The distinction between data and metadata is a grey area, as what is metadata in one model may be treated as data in another model and vice-versa.

A Document Database 288 provides optimized support for data models in which information is organized into structured units called documents. A document database is named such not because it stores documents themselves (they should be stored in the storage layer 260) but because it stores data as documents. Document databases offer performance advantages due to the way they de-normalize data for faster retrieval of data fields commonly used together. They also offer scalability advantages due to their ability to store their data documents across many different shards across different servers.

An Attribute/Value Pair Database 290 allows for quick lookup of single data fields.

A Text Index Database 292 is optimized for the extraction of words and phrases from unstructured text documents and the building of indices that allow for lookup and ranking of documents based on exact or "fuzzy" text queries. While it is possible to store the text of the documents themselves within the text index database, these databases tend not to be optimized for this sort of storage and are better used to store pointers to artifacts stored in the Storage Layer 260.

A Relational Database 294 supports the tabular and hierarchal representation of data and offers a mature data model technology platform as relational databases have been in use for longer than any of the other data representation technologies. Experimental data models can often be prototyped in the Relational Database 294 and used experimentally by the system 10 before being moved to a database technology more optimized for the representation.

A Cache Database 296 provides general purpose storage of results that the system 10 wants to be able to access again quickly. Most notably this allows the system 10 to store results from long-running computation tasks so that users don't have to incur computation time to access them. The cache database 296 can be implemented either as the serialization of data to disk stored as files available to the Application Server 276, or as artifacts within the Storage Layer 260, assuming retrieval overhead from storage layer 260 is low, or can be implemented with a more specialized cache database technology.

Figure 26:
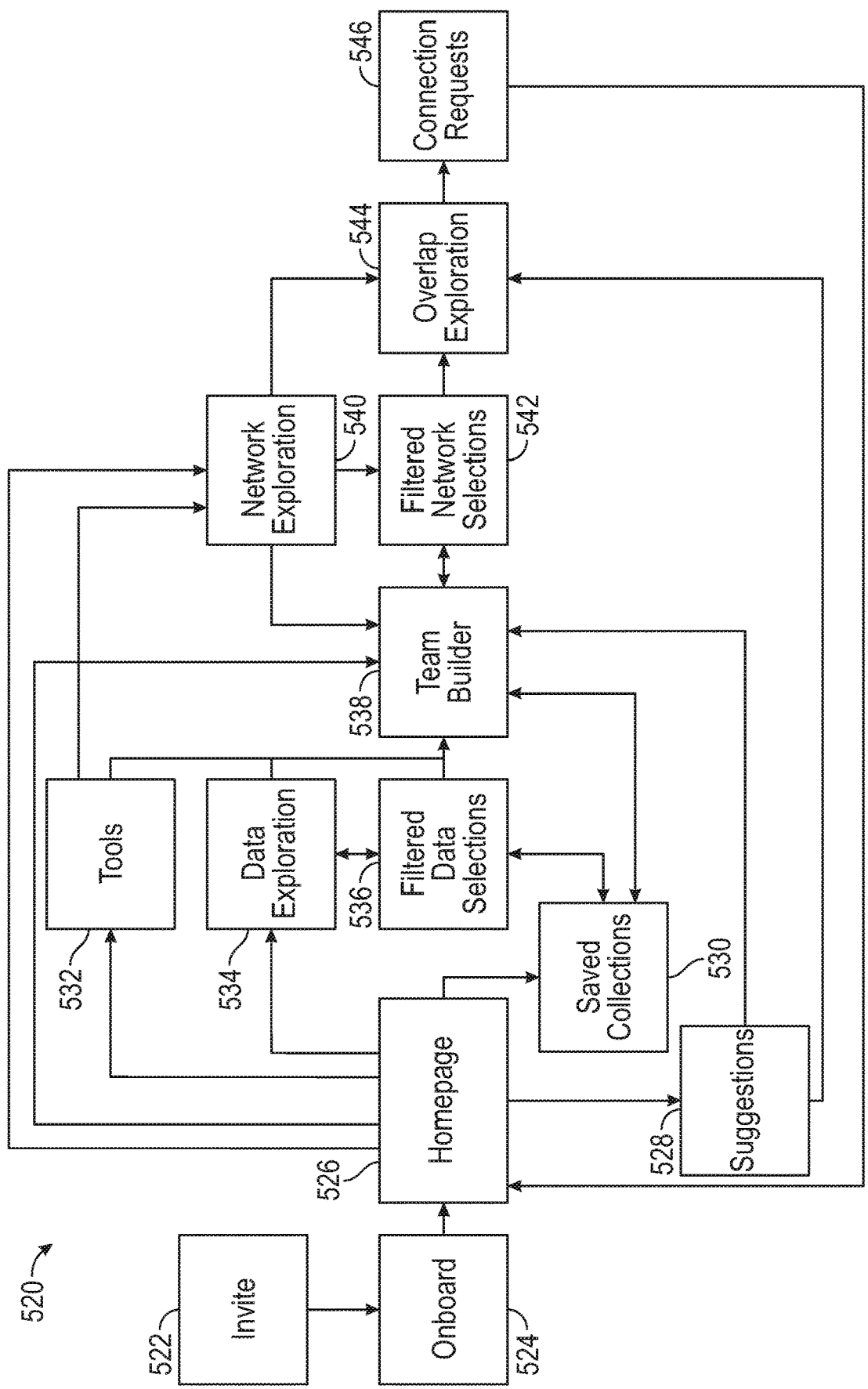
FIG. 26 is a workflow diagram that illustrates an exemplary operation of the computer implemented system of FIGS. 25-25D in accordance with the present disclosure.

The architecture 250 shown in FIG. 22 contains the necessary visual, algorithmic, and data functionality to implement a Closed-Loop Computer Aided Innovation Workflow shown in FIG. 26.

Figure 23:
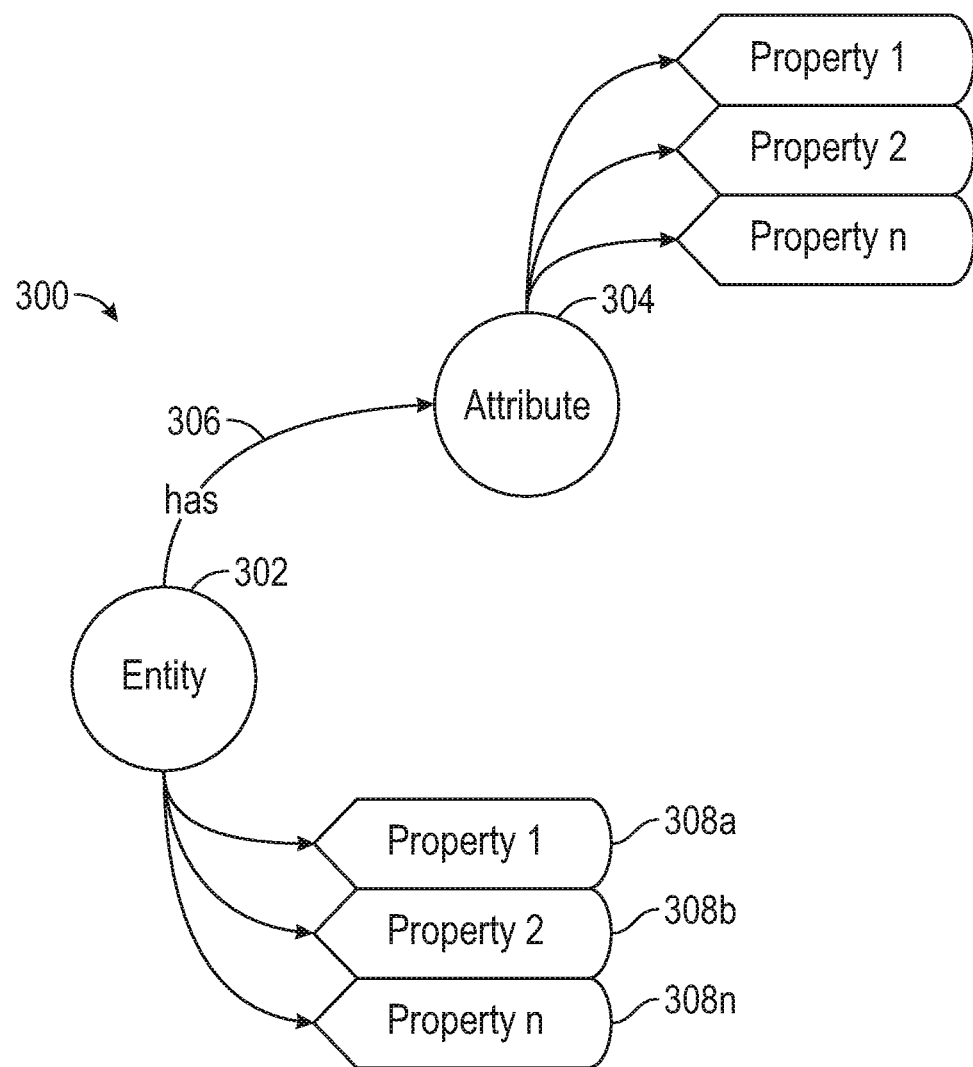
FIG. 23 is a graph schema illustrating an exemplary entity with an attribute and how properties and edges can be assigned to the entity and attribute in accordance with the presently disclosed inventive concepts.

Referring now to FIG. 23, shown therein is a schema 300 for a graph data model. This schema 300 is an extension of the simple node-node model shown in FIG. 9. It is a graph because it is comprised of nodes 302 and 304 linked together by an edge 306. Nodes 302 and 304 have properties 308a-n. Properties 308a-n are different from nodes 302 and 304 in that they cannot be linked to anything other than the node 302 or 304 they describe, while nodes 302 and 304 can be linked to multiple other nodes, which then can be linked to other nodes. This schema 300 provides a very flexible way to represent information when one node 302 represents an entity and other nodes such as node 304 represent attributes of the node 302 entity. In FIG. 23, there is just one entity 302 that has one attribute 304, but this pattern can be extended as needed to represent many entities with many attributes. The relationship by which the entity 302 is connected to the attribute 304 can optionally have properties 308a-n if additional detail needs to be captured about the nature of the connection. It is possible to represent this same information with more granular nodes with properties, but properties on edges provide performance optimization and are supported by some commercial graph database implementations. As both entities and attributes are both just nodes, it is also possible to link entities to entities and attributes to attributes, leading to a variety of possible configurations like the one shown in FIG. 10. The advantage of using the graph schema 300 of FIG. 23 to model information as opposed to traditional tabular data schemas like those developed for relational databases is that it allows for a "ragged schema" without creating null value ambiguity or overloaded fields. That is, if there is one entity with one value for attribute A, one entity with two values for attribute A, and one entity that does not have attribute A because it does not apply to that entity type, the graph schema can represent exactly that. A tabular schema would have to overload the attribute value for the second entity and have a null value for the third entity, which is not an accurate representation. In addition, the graph structure of FIG. 23 avoids the "fragile schema" problem of traditional tabular data schemas because if it becomes desirable to start incorporating an additional dimension into the data model, additional attribute nodes can be added for the entities that have that dimension, while maintaining the overall Entity-Attribute structure of the schema and therefore requiring no changes to the query structures of the application. In a tabular data model, the addition of additional dimensions requires the addition of columns to tables which change the underlying schema and require updates to query logic. Tabular data models that avoid these problems become graph schemas implemented via tables, such as a table that has columns "entity", "attribute", and "value". The ability to represent ragged schemas accurately and the ability to extend what is modeled without breaking application logic is fundamental to capturing the nuance for multi-dimensional analysis.

Figure 24A:
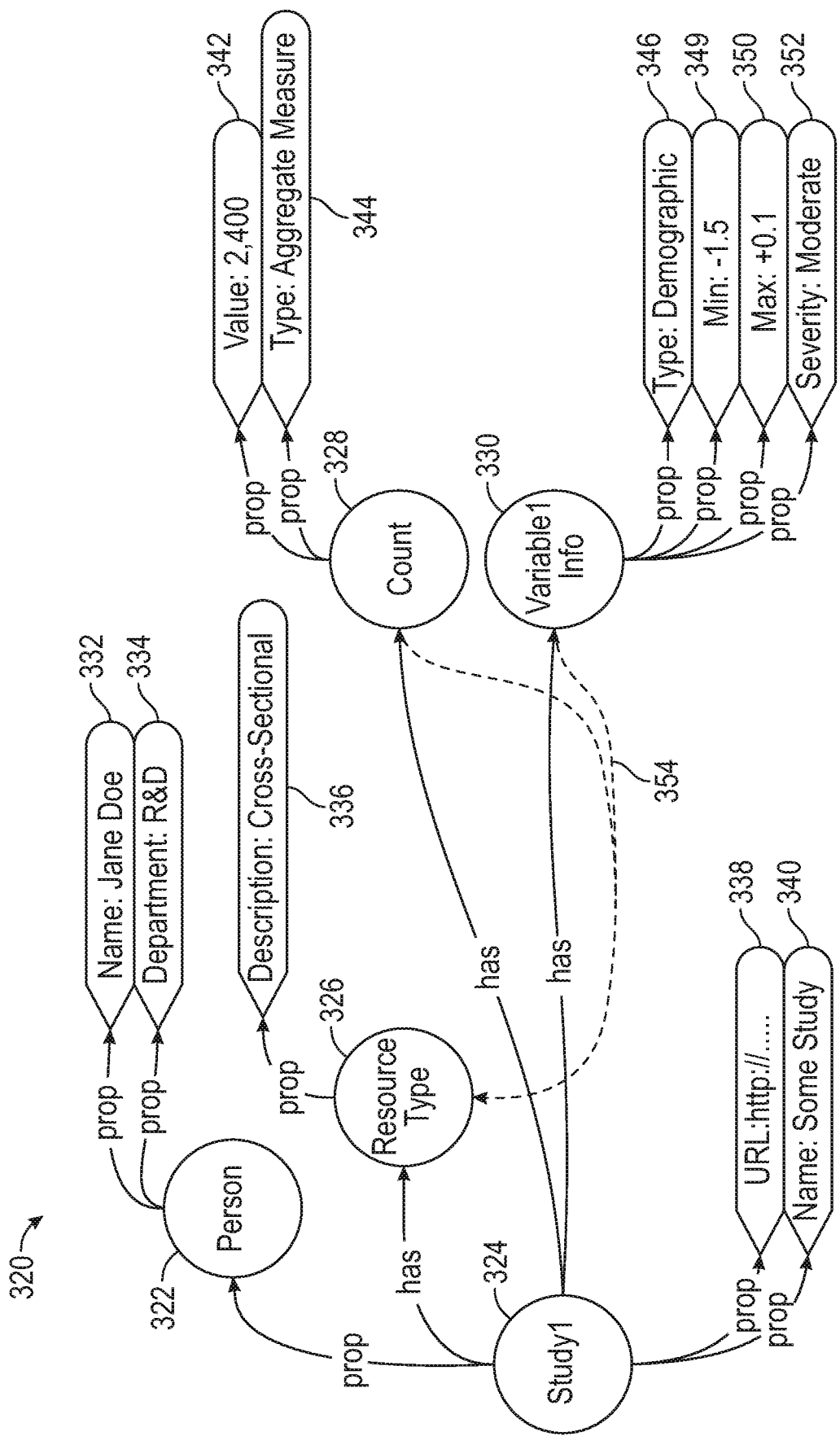
FIG. 24A is another graph schema illustrating connections between nodes and properties implemented to model information about a person, a non-person entity like a study, and additional attributes of both the person and non-person elements.

Referring now to FIG. 24a, shown is a schema 320 similar to the schema 300 of FIG. 23. Schema 320 models information about a person represented by node 322, a study represented by node 324, and includes additional attributes of the study such as nodes 326, 328, and 330. Node 322 has two properties 332 and 334, node 324 has two properties 338 and 340, node 326 has one property 326, node 328 has two properties 342 and 344, and node 330 has four properties 346, 348, 350, and 352. The properties 332-352 show various attributes of the nodes with which they are associated. For instance, property 332 indicates that "Jane Doe" is the name of a person associated with node 322. Because of the linkages represented in the schema 320, we know that "Jane Doe" is the "owner" of "Some Study", as shown by property 340 of node 324. The additional attributes of node 324 (Study 1) show that it is a cross-sectional study (property 336 attached to node 326) with an aggregate count of 2400 (property 342 of node 328) and containing a demographic variable (property 346 of node 330) with a min of −1.5 (property 348) and max of 0.1 (property 350), representing a "moderate" severity (property 352) of whatever variable1 (node 330) represents. This example is meant to illustrate the intentional ambiguity between the "entity" and "attribute" distinctions depicted in FIGS. 24A-24C. Jane Doe could be considered an "owner" attribute of the Study1 entity, or could be considered an "owner" entity with Study1 being an attribute of what is owned. The flexibility of the graph schema 320 lies in this ambiguity allowing queries to be written from both perspectives depending on use-case. Because Jane Doe's department (property 334) is modeled as a property on node 322, it isn't possible to add additional information about the department in this configuration. This is easily adjusted for, if additional information about the department becomes available, as shown in FIG. 24B.

Figure 24B:
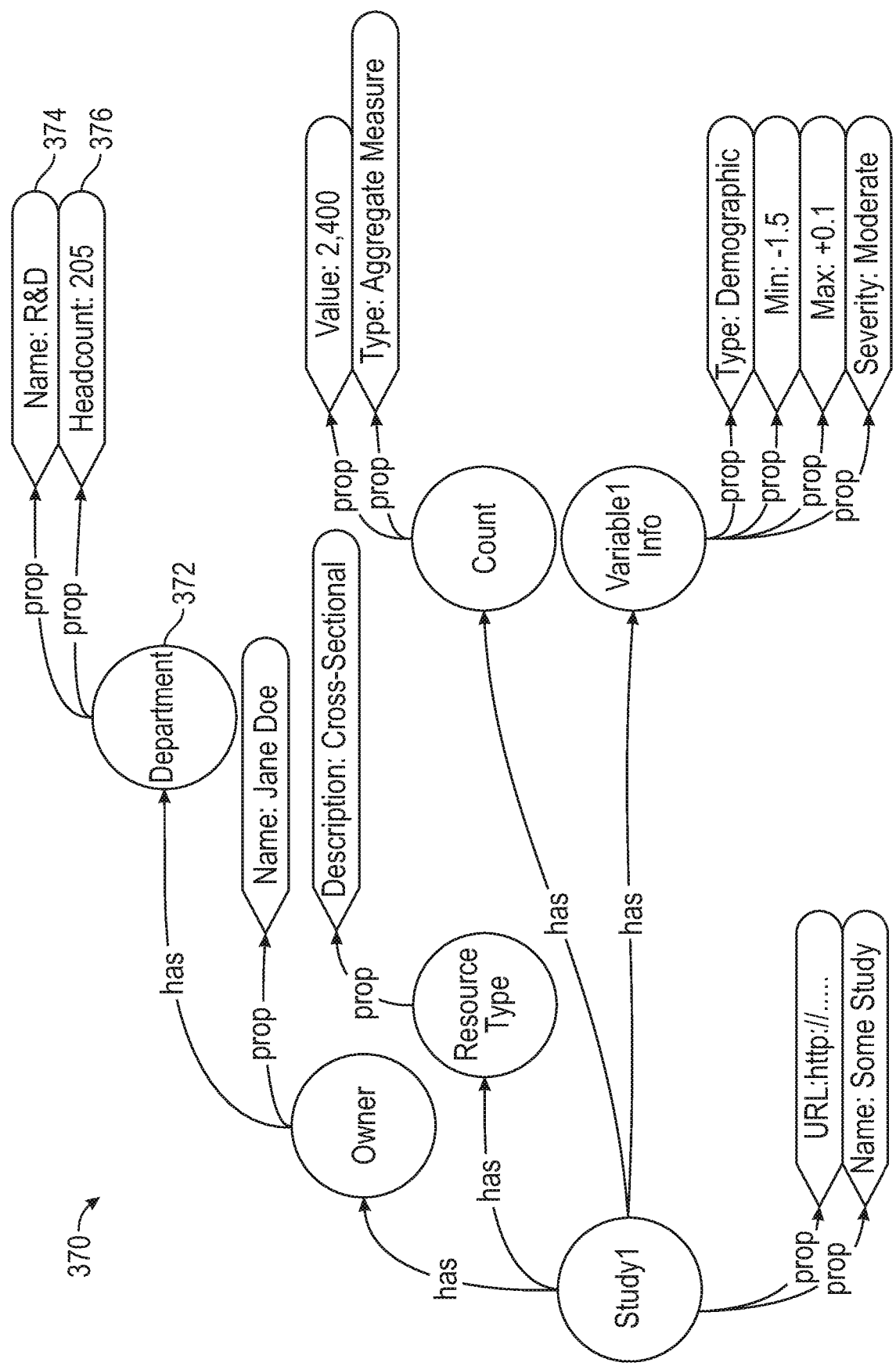
FIG. 24B is another graph schema illustrating how a property can be converted into a node to allow the information modeled in FIG. 24A to be expanded to add additional information associated with the person.

In FIG. 24B, a schema 370 is shown with a "department" node 372 which has been added to replace the "department" property 334 shown in FIG. 24A. Now that Jane Doe's department is a node 372 and not a property, node 372 can have its own properties 374 and 376 like name (property 374) and headcount (property 376).

Figure 24C:
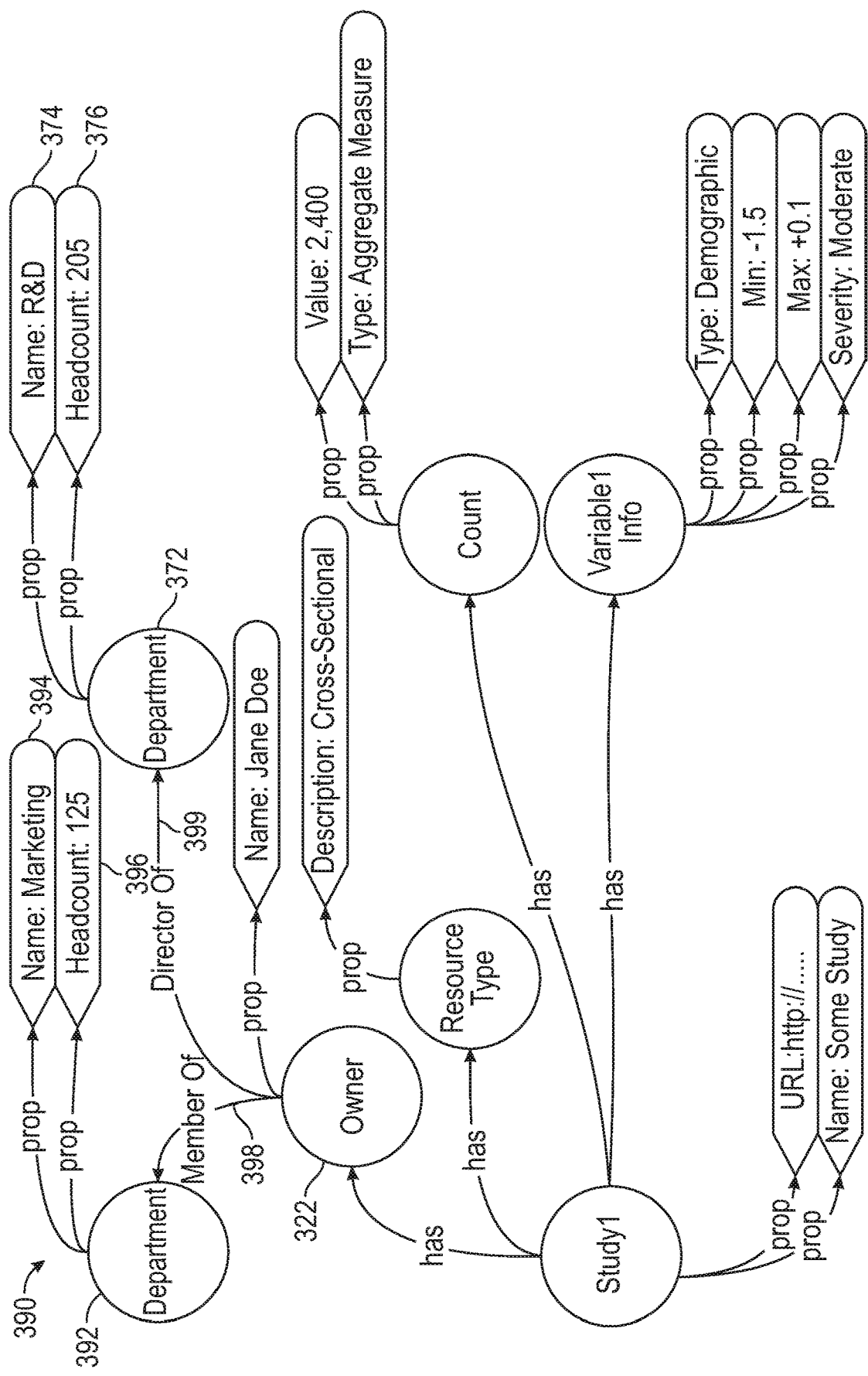
FIG. 24C is another graph schema illustrating how the information modeled in FIGS. 24A and 24B can be further expanded to add additional information associated with the person.

FIG. 24C shows schema 390 which illustrates how the schema 370 of FIG. 24B can be modified to model Jane Doe (node 322) belonging to more than one department. A second department node 392 has been added. If Jane's (node 322) role in the two departments (nodes 372 and 392) is different, this can be modeled through a process called reification in which the relationship between Jane (node 322) and each department is encapsulated in granular nodes 372 and 392 with properties 374 and 376 and 394 and 396, respectively, and attributes that define the nature of the relationship, as illustrated in FIG. 11 via a "context" node. However, it is often more performant to encode this information in edges 398 and 399 which allows us to move away from a single type of linkage relationship and towards multiple named edge types such as "member of" 398 and "director of" 399.

Figure 25:
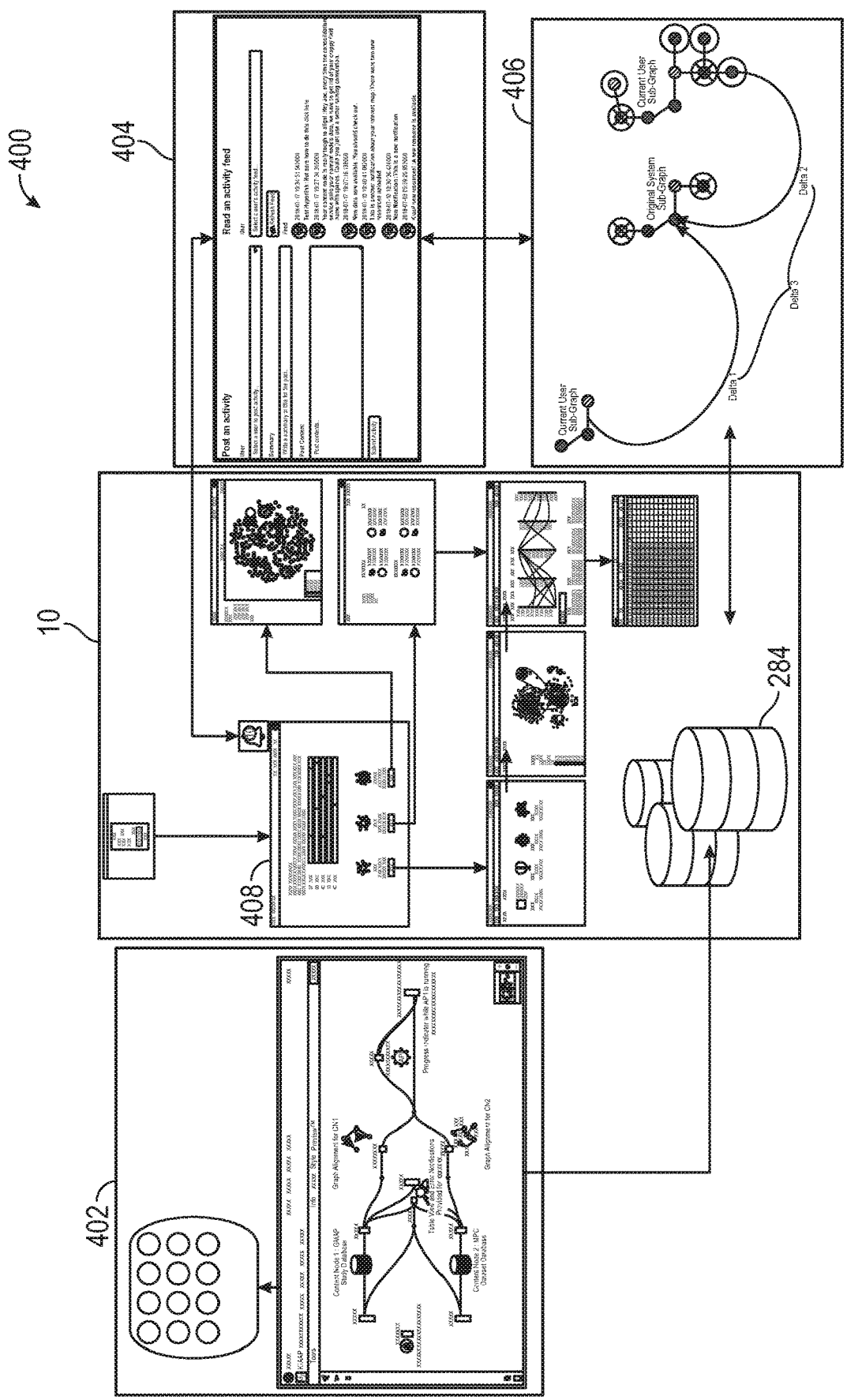
FIGS. 25-25D show a schematic of an exemplary implementation of the computer implemented system of FIG. 1 as part of a larger system in which the computer implemented system of FIG. 1 is connected to outside systems to gather and update information in accordance with the present disclosure.
Figure 25A:
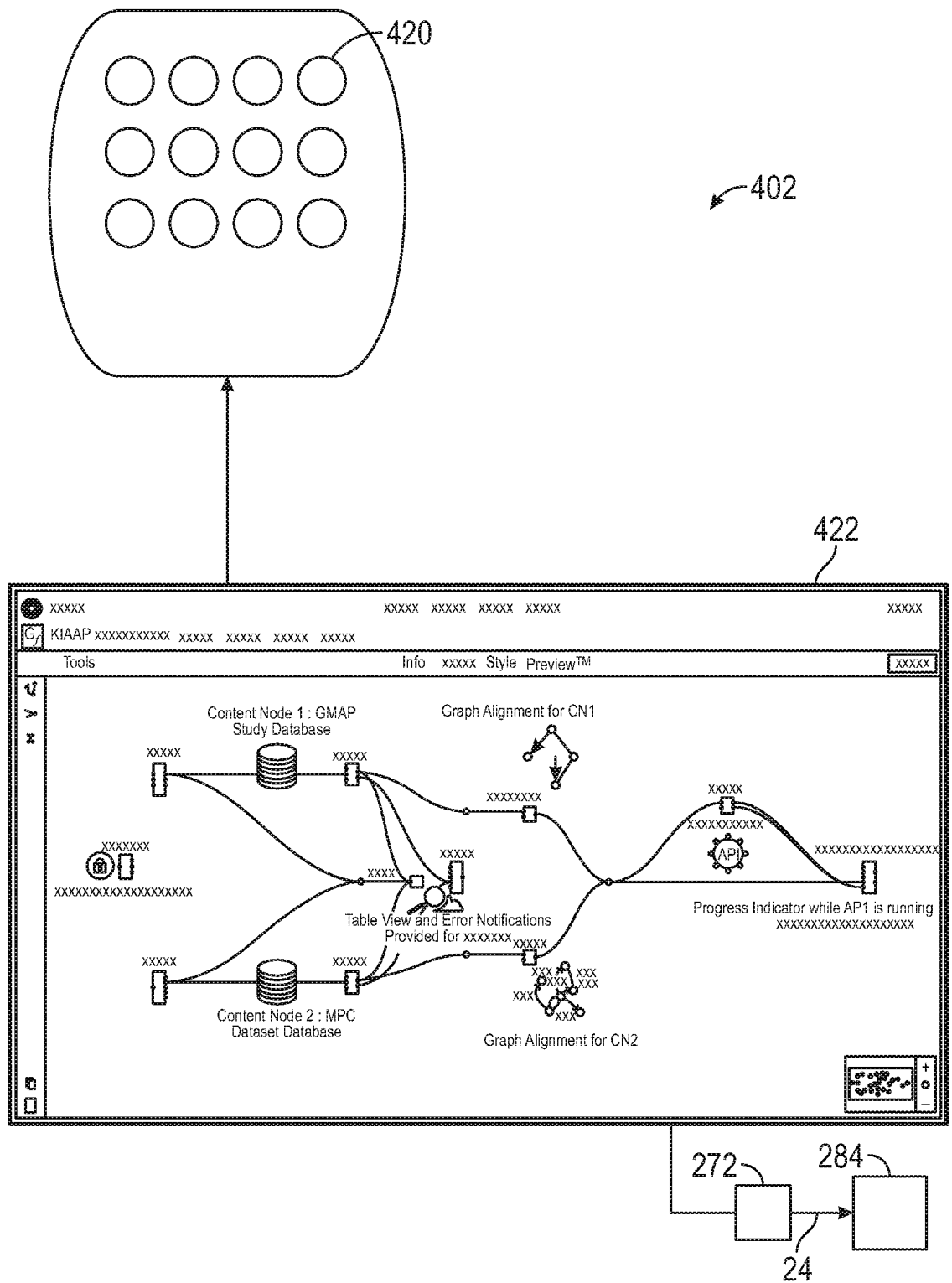
Figure 25B:
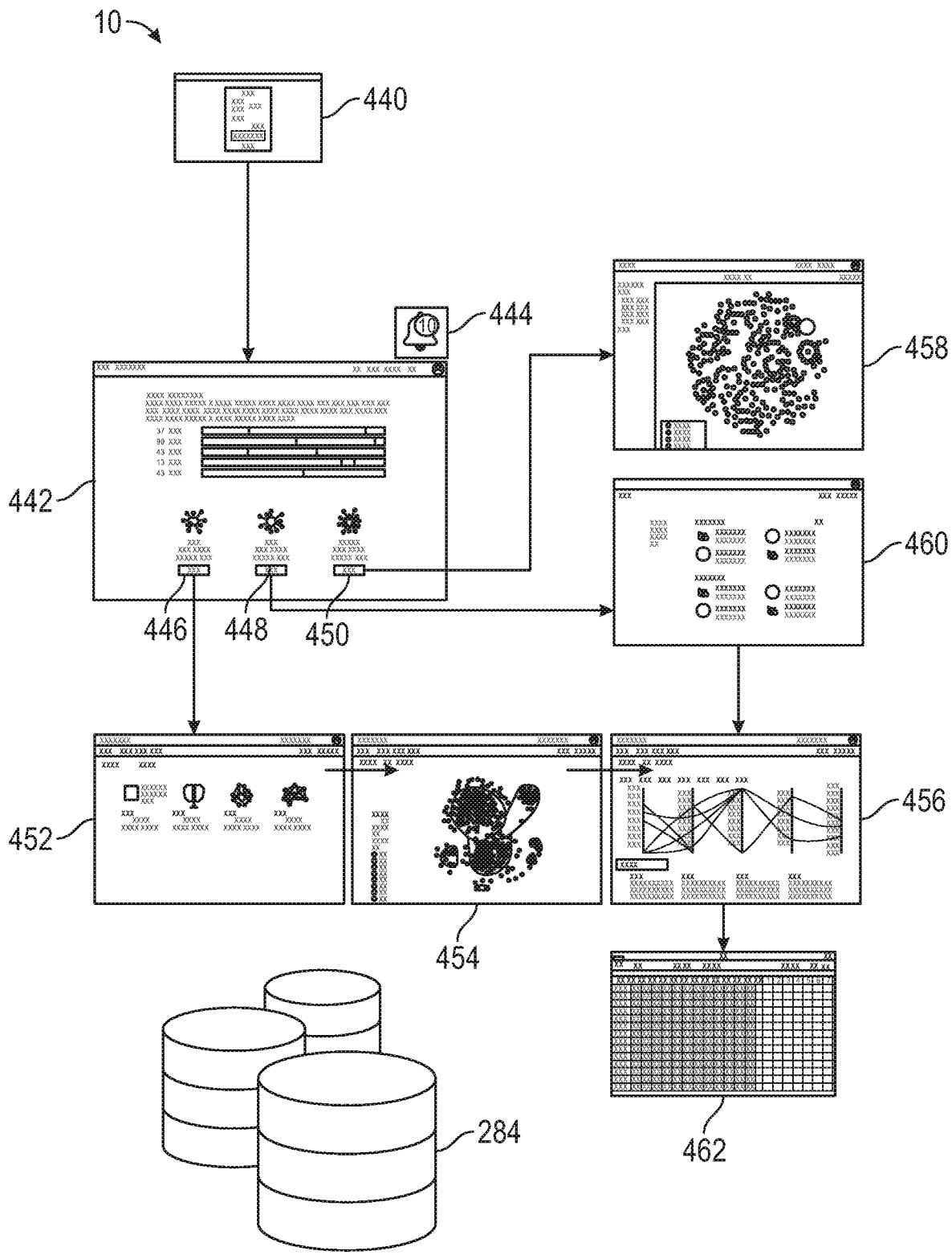
Figure 25D:
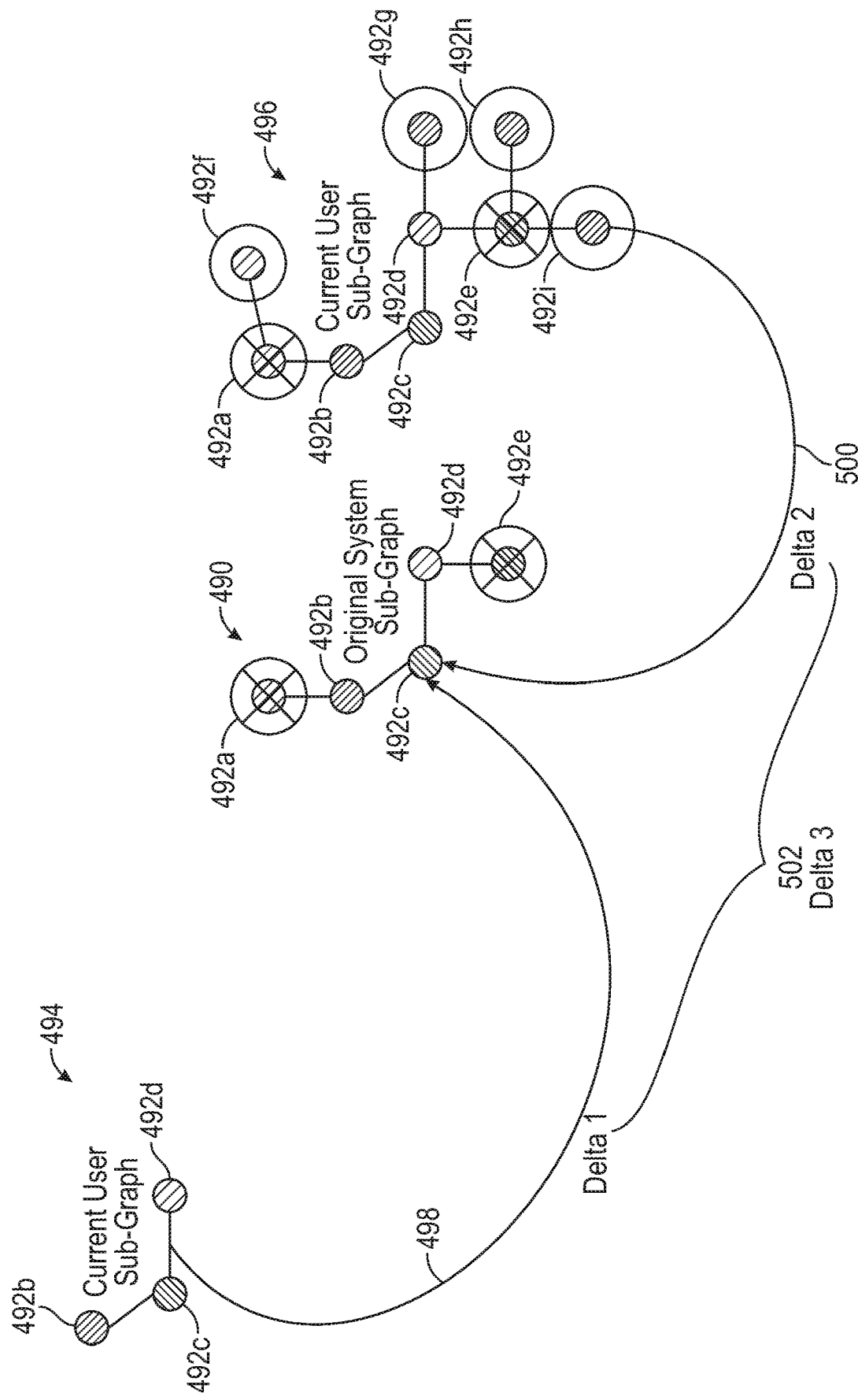

FIGS. 25-25D show an implementation of the system 10 as part of a larger system 400 in which a first external application 402 imports data into the multi-model database 284 of the invention via API (as described in the description of FIG. 22) and a second external application 404 is able to provide additional functionality to users by performing use-case specific computation 406 on data from the multi-model database 284 and using the results to adjust a user interface 408 in the system 10.

FIG. 25A shows the first external application 402 of FIG. 25 in more detail. The first external application 402 may be a dataflow application that queries a variety of different external data sources 420 (only one of which is numbered in FIG. 25A), aggregates and aligns the query results to be consistent with the graph schema shown in FIGS. 23-24, and imports the aggregated and aligned data into the multi-model database 284 via API 272, for instance. The first external application 402 can consume data sources like the excel file shown in FIG. 3, or databases, or other system APIs, and expose a user-interface like shown in FIG. 12.

FIG. 25B shows a series of screenshots of implementations of the system 10 consistent with the software architecture 250 of FIG. 22 and with a workflow that will be explained in further detail with regard to FIG. 26. Based on the data available in the multi-model database 284, users can enter the system 10 through a login screen 440 having fields that allow the user to input unique information such as a username and password that may be sent to the system 10 for verification. Once the user has been verified and gained access to the system 10, a homepage 442 may be displayed. The homepage 442 displays information pertinent to the user such as a notification section 444 that indicates an event of note to the user such as suggestions they might be interested in. The homepage 442 allows the user to access to data by selecting icons or regions on the homepage such as buttons 446, 448, or 450. When the user selects button 446, for instance, the system 10 is programmed to display data exploration user-interfaces 452-456 that are programmed to visually display data from the multi-model database 284 in different ways based on the use case. The data exploration user-interfaces 452-456 can include, but aren't limited to, a list view 452, a grouped network view 454, and a parallel coordinates view 460. Button 450 on the homepage 442 may be programmed to display network exploration tools 458, the most common implementation being an interactive network diagram, though other visualizations can be implemented to support network exploration. Button 448 may be programmed to display external tools 460 that can be configured by a system administrator. These tools can link to each other so that actions taken in one tool can launch other tools, and these tools can export artifacts such as Excel sheet 462 that can be used independent of the system 10.

FIG. 25C shows an example of the second external application 404 that extends the functionality of the system 10 by using the API 272. The second external application 404 may be provided with a write section 480 and a read section 482 that allow the user to access information in the multi-model database 284 through the API 272. The API 272 allows external applications, such as the second external application 404, to update information in the multi-model database 284. When information pertinent to the user is updated, the system 10 is programmed to send a notification to the user which is displayed in the notification section 444 of the homepage 442, for instance, notifying the user that there are new suggestions available to them based on the algorithm.

FIG. 25D shows use-case specific computation 406 which is one embodiment of a way in which the system 10 monitors changes that happen in graphs of the multi-model database 284 and determines which of those changes might be of interest to the user. For instance, the user may have shown interest in all or a particular portion of system sub-graph 490 either through the explicit saving of the system sub-graph 490 to their collections or through implicit gathering of usage information (both options will be described in further detail with regard to FIG. 26). The user's curation of the system sub-graph 490 may involve removing nodes that aren't of interest to them. By way of illustration, system sub-graph 490 is shown having nodes 492a-492e. Removal of nodes 492a and 492e, for instance, results in user sub-graph 494 having nodes 492b, 492c, and 492d. When new data (nodes 492f-492i) is added later to the system sub-graph 490 resulting in current system sub-graph 496, the system 10 is programmed to alert the user to the new nodes that have been added without alerting them to nodes they previously removed. To accomplish this a first delta 498 is computed between the system sub-graph 490 available at the time the user saved their sub-graph 494—the first delta 498 determines which nodes were removed (492a and 492e in this example). A second delta 500 is computed between the system sub-graph 490 and the current sub-graph 496 as of the availability of new data to identify all new nodes (492f-492i). Then a third delta 502 is computed that identifies just the new node of interest 492g by removing new nodes 492f, 492h, and 492i linked to nodes 492a and 492e that were identified by the first delta 498. This is just one possible implementation of alerting users to changes in the system graphs.

FIG. 26 illustrates a workflow 520 which may be referred to as a Closed-Loop Computer Aided Innovation Workflow. The workflow 520 collects a variety of data (directly and indirectly) about a variety of different entities, including people, in order to populate the Multi-Model Database 284 (shown in FIG. 22) of the system 10. In step 522, an electronic invite is sent to a new user of the system 10, allowing the new user to onboard into the system 10 in step 524. In step 524, an onboarding survey collects qualitative and quantitative information about the new user. The data gathered in the onboarding survey at step 524 is driven by data stored in the Multi-Model Database 284 that control both the questions asked, the available answers, and the user-interface methods for answering, thus allowing different implementations to support different types of information gathering depending on use-case.

Once onboarded, the new user is directed to a Homepage (such as user interface 170 illustrated in FIG. 14) in step 526 which provides links to other features of the system 10.

The system 10 may provide suggestions for collaboration opportunities in step 528 as described herein which may lead to improved innovative output. The suggestions may be displayed on the homepage 170 as illustrated in FIG. 14. Alternatively, suggestions may be sent to the user using other methods such as email, text, etc.

Suggestions for new users are generated based on data the new user provided during onboarding merged with the data already available in the system 10. When the new user first joins the system 10, the information known about the new user is limited and self-reported, limiting the suggestions that can be computed, so the system 10 provides a variety of ways to increase the data available to it. If information about the new user of the system 10 exists in other systems (such as the first and second external application 402 and 404, for instance), the information can be loaded directly into the Multi-Model Database 284 via the system's API 272 as illustrated and described with regard to FIG. 22. Loading data via API 272 is useful in that it can be used in place of user onboarding surveys if it is believed that the onboarding survey creates too high a barrier to entry to acquire users. Data loading via API 272 can be implemented to pull data from files like the Excel file shown in FIG. 3, or can be implemented with more complex logic, as shown in FIG. 25a which queries multiple external systems, aligns results to be stored in the Multi-Model Database 284, and calls the system API 272 with the combined results. API 272 data imports can also be scheduled to run on a recurring periodic basis in order to synchronize the data in the Multi-Model Database 284 with changing data in external systems.

In addition to data that is collected directly either via onboarding survey or API import, the system 10 can also collect data indirectly by communicating user activity data back to the Multi-Model Database 284 via the system API 272. Because the system 10 provides the user access to a wide variety of different modules such as Saved Collections 530, Tools 532, Data Exploration 534, Data Filtering and Selection 536, Team Builder 538, Network Exploration 540, Filtered Network Selections 542, Overlap Analysis 544, and Connection Requests 546, the system 10 has the potential to indirectly collect a wide range of data about user interests. An example of a system configured to provide access to a variety of tools across these different areas is shown in FIG. 25. Importantly, indirect usage reporting is configurable so that the system can meet whatever level of privacy is desired, from no indirect reporting at all to detailed usage analytics. Users can also administer different aspects of their account, including the data that is collected about them, through a user interface such as the User Profile interface 240 shown in FIG. 21.

The Tools 532 that are available to the user are defined in the Multi-Model Database 284, which means that any web-based tool can be made available provided the appropriate entries are made in the Multi-Model Database 284. Because the Multi-Model Database 284 supports modeling data about things other than users, data assets that may be of interest to users can be stored in the Data Layer 258 and made available for Data Exploration module 534 through a variety of different data visualizations. A filtered data selection 536 module allows filtering and selecting subsets of data which allow users to drill-in to particular portions of data that are of interest to them and save their selections to Saved Collections 530 associated with the user. The Network Exploration 540 module of the system 10 allows users to explore how the data related to the entities contained within the Multi-Model Database 284 are related to each other. This has been implemented using network diagram visualizations such as the one shown in FIG. 17 but could also be implemented via a variety of other visualization methods depending on the use-case. The Filtered Network Selection module 542 allows users to filter and select sub-graphs of the network.

The Filtered Data Selections module 536 allows the user to filter and select subsets of data such as the data stored in the Multi-Model Database 284. An example of a sub-graph selection is shown in FIG. 19.

Innovation is generated when existing entities are combined in new and novel ways. The Team Builder module 538 allows the user to assemble new networks based on the entities and relationships already modeled in the Multi-Model Database 284, an implementation of which is shown in FIG. 20. Traditionally "Teams" are thought of as being limited to people, but the system 10 makes no fundamental distinction between person entities in the data model or non-person entities, meaning that both the Suggestion module 528 and the Team Builder module 538 can be used to assemble teams of things other than people—for example, teams of documents, teams of code components, teams of disease symptoms, etc.—or teams comprised of a combination of entity types.

Combining entities in new ways is a necessary but not sufficient condition for innovation. The user must be able to gain some knowledge about the new combination. The Overlap Exploration module 544 allows users to see what is in common to combinations of entities and what is unique in order to understand synergies and complementary difference. One example of an Overlap Exploration module 544 user interface that is optimized for exploring 2-entity overlap is shown in FIG. 16, but many other interfaces could be implemented to explore overlap of more than 2 entities, including network diagrams like those shown in FIGS. 17-20.

Users can use the exploratory components of the system 10 to discovers entities they believe offer innovative synergy, but they may not have access to the actual entities. The Connection Requests 546 allow users to request access. If the entity the user wants to collaborate with is another person, this connection request is similar to connection requests made in social networks, but if the entity is a non-person entity, like a dataset the user wants to work with or a project they want to be involved with, the connection request will be routed to either an automated set of actions to give the user access, or to a user in the system 10 assigned to the connection requests for that entity. The configurations of these routings are stored in the Multi-Model Database 284 so that they can be customized based on entity type and use-case.

This workflow 520 is considered closed-loop because the activities of the users working within the system 10 generate data which is stored in the Multi-Model Database 284 and used to recommend suggestions to users which lead to them performing new activities which then generate new data resulting in new suggestions. In order to fine-tune this feedback loop, which is driven by the suggestion module 528 offering suggestions to the user, the system 10 exposes the parameters of the suggestion algorithm to the administrators of the system 10 as shown in FIG. 13 so that the administrator can adjust what types of suggestions are provided. This allows the administrator to adjust where in the spectrum of possible options, as shown in FIG. 15, the administrator want the system 10 to recommend. This is conceptually equivalent to adjusting the desired degree of overlap of the two Venn diagram circles shown in FIG. 2, but doing so for the n-dimensions available in the system's data model.

From the above description and examples, it is clear that the inventive concepts disclosed and claimed herein are well adapted to attain the advantages mentioned herein. While exemplary embodiments of the inventive concepts have been described for purposes of this disclosure, it will be understood that numerous changes may be made which will readily suggest themselves to those skilled in the art and which are accomplished within the spirit of the inventive concepts disclosed and claimed herein.

What is claimed is:

1. A method, comprising:
   categorizing, by a processor, a first data element in a database with a first attribute of a first dimension and with a first attribute of a second dimension, the first dimension and the second dimension being an aspect of a situation, problem, person, or thing;
   categorizing, by the processor, a second data element in the database with a second attribute of the first dimension and with a second attribute of the second dimension;
   categorizing, by the processor, a third data element in the database with a third attribute of the first dimension and with a third attribute of the second dimension;
   receiving, through a user interface or an application programming interface, a plurality of parameters related to a complementary difference computation and a generation of a complementary recommendation;
   performing the complementary difference computation by:
   analyzing, by the processor, the first attribute, the second attribute, and the third attribute of the first dimension to determine a first score of similarity and dissimilarity between each of the first attribute, the second attribute, and the third attribute of the first dimension based upon at least some of the plurality of parameters;
   analyzing, by the processor, the first attribute, the second attribute, and the third attribute of the second dimension to determine a second score of similarity and dissimilarity between each of the first attribute, the second attribute, and the third attribute of the second dimension based upon at least some of the plurality of parameters;
   calculating, by the processor, a composite score for each pairwise combination of the first, second, and third data elements based at least in part on the first score between each attribute of the first dimension for a particular data element pair; the second score of the second dimension for the particular data element pair; and at least some of the plurality of parameters;
   generating, by the processor executing a recommendation algorithm, a complementary recommendation to link two of the first data element, second data element, and third data element when the composite score of the particular data element pair is within numerical limits and based upon at least some of the plurality of parameters; and
   returning the complementary recommendation via the application programming interface, that upon interaction, permits exploration of the links between each of the first data element, the second data element, and the third data element on a dimensional basis.

2. The method of claim 1, further comprising:
   generating, by the processor, a link between the first and second data element when the composite score is within numerical limits.

3. The method of claim 2, wherein the numerical limits are predetermined.

4. The method of claim 2, wherein the numerical limits are dynamic.

5. The method of claim 2, further comprising storing, by the processor, the link between the first and second element in the database.

6. A computer system comprising:
   one or more processors; and
   one or more non-transitory computer readable medium storing computer executable code that when executed by the one or more processors cause the one or more processors to:
   receive, through a user interface or an application programming interface, parameters related to a complementary difference computation; and
   perform a complementary difference computation by:
   analyzing a first attribute, a second attribute, and a third attribute of a first dimension to determine a first score of similarity and dissimilarity between each of the first attribute, second attribute, and third attribute of the first dimension based upon at least some of the parameters, the first attribute being assigned to a first data element, and the second attribute being assigned to a second data element, the third attribute being assigned to a third data element, the first dimension being an aspect of a situation, problem, person, or thing;

analyzing a fourth attribute, a fifth attribute, and a sixth attribute of a second dimension to determine a second score of similarity and dissimilarity of the fourth attribute, fifth attribute, and sixth attribute of the second dimension based upon at least some of the parameters, the fourth attribute being assigned to the first data element, the fifth attribute being assigned to the second data element, and the sixth attribute being assigned to the third data element, the second dimension being an aspect of the situation, problem, person, or thing that is different from the first dimension;

calculating a composite score for each pairwise combination of first, second, and third data elements based at least in part on the first score and the second score;

generate a complementary recommendation to link two of the first data element, the second data element, and the third data element when the composite score of a particular data element pair is within numerical limits; and return the complementary recommendation via the application programming interface, that upon interaction, permits exploration of the links between each of the first data element, the second data element, and the third data element on a dimensional basis.

7. The computer system of claim 6, wherein the computer executable code that when executed by the one or more processors cause the one or more processors to generate a link between the first and second data element when the composite score is within numerical limits.

8. The computer system of claim 7, wherein the numerical limits are predetermined.

9. The computer system of claim 7, wherein the numerical limits are dynamic.

10. The computer system of claim 7, wherein the computer executable code that when executed by the one or more processors cause the one or more processors to store the link.

11. The computer system of claim 6, further comprising a database storing data, the data having a plurality of distinct data elements including the first data element and the second data element, each of the plurality of data elements being assigned a plurality of dimensions including the first dimension and the second dimension, and each of the plurality of dimensions being assigned at least one attribute including the first attribute and the second attribute, and the third attribute and the fourth attribute.

12. The computer system of claim 11, wherein the computer executable code that when executed by the one or more processors cause the one or more processors to return the complementary recommendation via the application programming interface by including data regarding similarities and differences of the first data element and the second data element on a dimension by dimension basis.

13. The computer system of claim 11, wherein the computer executable code that when executed by the one or more processors cause the one or more processors to return the complementary recommendation via the application programming interface with a network format relating a combinatorial solution space of composite scores, the application programming interface having an input mechanism configured to allow a user to interactively explore the combinatorial solution space of composite scores.

14. The computer system of claim 11, wherein the computer executable code that when executed by the one or more processors cause the one or more processors to return the complementary recommendation via the application programming interface with a network format configured to allow a user to build a team by incrementally selecting data elements and dimensions of interest about those data elements in order to receive resulting network dynamics with each addition or subtraction.

\* \* \* \* \*